US012587665B2

(12) United States Patent
Hsin et al.

(10) Patent No.: US 12,587,665 B2
(45) Date of Patent: Mar. 24, 2026

(54) HARDWARE EFFICIENT DECODER SIDE MOTION VECTOR REFINEMENT

(71) Applicant: GOOGLE LLC, Mountain View, CA (US)

(72) Inventors: Yi-Chih Hsin, Zhubei (TW); In Suk Chong, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/766,519

(22) Filed: Jul. 8, 2024

(65) Prior Publication Data

US 2025/0016340 A1     Jan. 9, 2025

Related U.S. Application Data

(60) Provisional application No. 63/512,134, filed on Jul. 6, 2023.

(51) Int. Cl.
| | |
|---|---|
| *H04N 7/12* | (2006.01) |
| *H04N 19/127* | (2014.01) |
| *H04N 19/167* | (2014.01) |
| *H04N 19/176* | (2014.01) |
| *H04N 19/43* | (2014.01) |
| *H04N 19/513* | (2014.01) |
| *H04N 19/56* | (2014.01) |
| *H04N 19/573* | (2014.01) |

(52) U.S. Cl.
CPC ........... *H04N 19/43* (2014.11); *H04N 19/127* (2014.11); *H04N 19/167* (2014.11); *H04N 19/176* (2014.11); *H04N 19/521* (2014.11); *H04N 19/56* (2014.11); *H04N 19/573* (2014.11)

(58) Field of Classification Search
CPC .................................................... H04N 19/176
See application file for complete search history.

(56) References Cited

U.S. PATENT DOCUMENTS

| | | | | |
|---|---|---|---|---|
| 9,204,163 B2 * | 12/2015 | Kim | ..................... | H04N 19/577 |
| 10,863,170 B2 * | 12/2020 | Rusanovskyy | ........ | H04N 19/30 |

* cited by examiner

*Primary Examiner* — Y Lee
(74) *Attorney, Agent, or Firm* — Young Basile Hanlon & MacFarlane, P.C.

(57) ABSTRACT

Various hardware arrangements for use with a hardware decoder are described to perform motion vector (MV) refinement. A buffer stores pixel values for a first prediction block identified by a first initial MV and pixels defined by a first search area and stores a second prediction block identified by a second initial MV and pixels defined by a second search area. The first and second initial MVs were used for inter prediction of a block of image data. Second hardware components determine, for multiple pixel locations defined by respective offsets, a respective difference value between the blocks shifted by the offsets. A third hardware component determines a minimum of the difference values to identify an offset MV for MV refinement, and a fourth hardware component outputs one or more refined values based on the offset MV to reconstruct a sub-block of the block.

19 Claims, 18 Drawing Sheets

754

752

756

758

750

1100

906_16 — OBTAIN SECOND PREDICTION BLOCK $P_1$ USING $MV_1$

906_2 — MORE $\Delta MV_x$ HORIZ OFFSETS?

NO

YES

906_4 — MORE $\Delta MV_y$ VERT OFFSETS?

YES

906_6' — COMPUTE REFINED MOTION VECTOR REFINEDMV$_0$

906_8 — OBTAIN FIRST PREDICTION BLOCK $P_0$ USING REFINEDMV$_0$

906_12' — COMPUTE SIMILARITY METRIC

906_14' — IDENTIFY OPTIMAL REFINEDMV$_0$ CORRESPONDING TO BEST SIMILARITY

Figure 12:
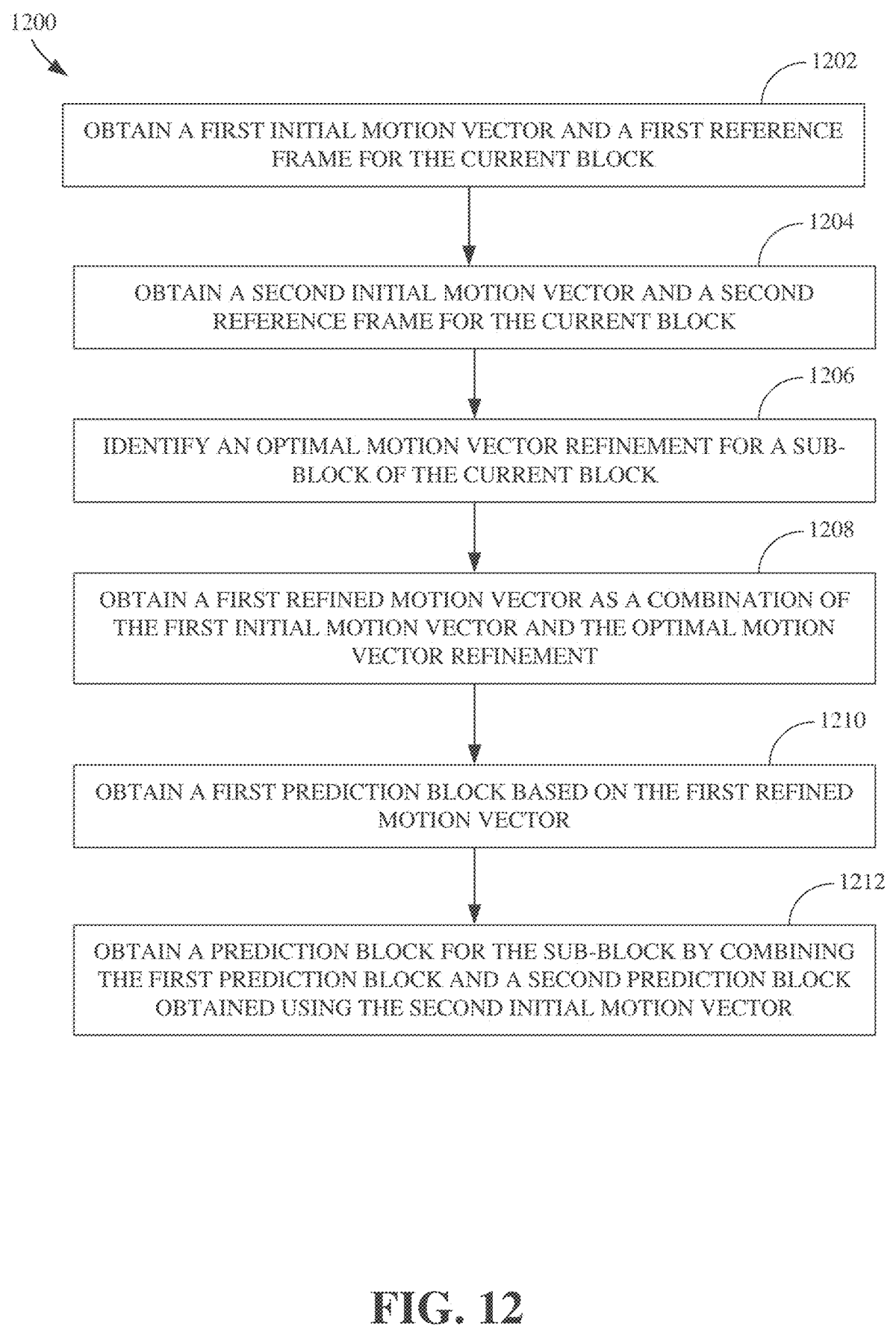

1200

1202

OBTAIN A FIRST INITIAL MOTION VECTOR AND A FIRST REFERENCE FRAME FOR THE CURRENT BLOCK

1204

OBTAIN A SECOND INITIAL MOTION VECTOR AND A SECOND REFERENCE FRAME FOR THE CURRENT BLOCK

1206

IDENTIFY AN OPTIMAL MOTION VECTOR REFINEMENT FOR A SUB-BLOCK OF THE CURRENT BLOCK

1208

OBTAIN A FIRST REFINED MOTION VECTOR AS A COMBINATION OF THE FIRST INITIAL MOTION VECTOR AND THE OPTIMAL MOTION VECTOR REFINEMENT

1210

OBTAIN A FIRST PREDICTION BLOCK BASED ON THE FIRST REFINED MOTION VECTOR

1212

OBTAIN A PREDICTION BLOCK FOR THE SUB-BLOCK BY COMBINING THE FIRST PREDICTION BLOCK AND A SECOND PREDICTION BLOCK OBTAINED USING THE SECOND INITIAL MOTION VECTOR

SADx25

Find
Min25

1302

MUX

RefinedMV0, 1
P0, P1 PixelOut

P0, P1 PixelIn

Pixel
Shifter

20x20 Pixel Buffer

1310

1304

1350

| | C0 | C1 | C2 | C3 | C4 |

Blk#0

25
SADs

FindMin25 and
MUX

Blk#1

25
SADs

FindMin25 and
MUX

Blk#2

25
SADs

FindMin25 and
MUX

1500

1550

1600

1650

HARDWARE EFFICIENT DECODER SIDE MOTION VECTOR REFINEMENT

CROSS-REFERENCE TO RELATED APPLICATION

This application claims priority to and the benefit of U.S. Provisional Patent Application No. 63/512,134, filed Jul. 6, 2023, the content of which is incorporated in its entirety by reference.

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other coding techniques. These techniques may include both lossy and lossless coding techniques.

For reconstruction of the coded data, both software and hardware decoders may be used.

SUMMARY

This disclosure relates generally to decoding video data and more particularly relates to decoder side motion vector refinement and even more particularly to hardware that can perform motion vector refinement at a decoder.

A first aspect of the teachings herein is a hardware arrangement for decoder side motion vector refinement. The hardware arrangement includes a first hardware component that includes a buffer configured to store pixel values of pixels of a first prediction block from a first reference frame that is identified by a first initial motion vector (MV) and pixels defined by a first search area of the first prediction block, and configured to store a second prediction block from a second reference frame that is identified by a second initial MV vector and pixels defined by a second search area for the second prediction block, wherein the first initial MV vector and the second initial MV were used for inter prediction of a current block of image data. The hardware arrangement also includes a number of second hardware components configured to, for multiple pixel locations of the first search area and the second search area defined by respective offset motion vectors (MVs), determine a respective difference value between the first prediction block and the second prediction block shifted by the respective offset MVs, a third hardware component configured to determine a minimum of the respective difference values, a location of the minimum associated with an offset MV of the respective offset MVs, and a fourth hardware component configured to output at least one refined value for reconstruction of a sub-block of the current block determined using the offset MV, wherein the at least one refined value comprises at least one of a first refined MV determined by modifying the first initial MV using the offset MV, a second refined MV determined by modifying the second initial MV using the offset MV, a refined first prediction block centered at a position within the first reference frame identified by the first refined motion vector, or a refined second prediction block centered at a position within the second reference frame identified by the second refined motion vector.

In some implementations of the hardware arrangement, the number of second hardware components is dependent on a defined number of clock counts associated with a desired throughput. Alternatively, or additionally, the number of second hardware components is dependent on whether the multiple pixel locations of the first area and the second search area are processed using a 1-stage process or a 2-stage process. In some examples, the defined number of clock counts is 1, 4, 13, or 14 clock counts.

The buffer can include two 20×20 pixel buffers, where each of the first prediction block and the second prediction block comprises a 16×16 pixel block. The first of the two 20×20 pixel buffers stores the first prediction block with pixels about a periphery of the first prediction block defined by the first search area, and the second of the two 20×20 pixel buffers stores the second prediction block and pixels about a periphery of the second prediction block defined by the second search area. The pixels about the periphery of each prediction block may be two rows extending from each of the first and bottom rows of the prediction block and two columns of pixels extending from each of the left and right columns of the prediction block.

In some implementations of the hardware arrangement, there are 25 second hardware components, a first set of 9 second hardware components and a second set of 5 second hardware components, 5 second hardware components, or 1 second hardware component.

In some implementations of the hardware arrangement, the minimum of the respective difference values is selected using a 1-stage process or a 2-stage process.

The hardware arrangement can include a latch configured to store an output of the third hardware component.

In some implementations of the hardware arrangement including the latch, the multiple pixel locations of the first search area and the second search area are processed using a 1-stage process, the first search area comprises a 5×5 pixel area about a center pixel of the first prediction block, the second search area comprises a 5×5 pixel area about a center pixel of the second prediction block, the number of second hardware components comprises 7 second hardware components, each determining at least one difference value, and the third hardware component is configured to determine the minimum of the respective difference values by determining a first intermediate minimum using a first set of 7 difference values from the second hardware components as input, determining a second intermediate minimum using a second set of 7 difference values from the second hardware components and the first intermediate minimum stored by the latch as input, determining a third intermediate minimum using a third set of 7 difference values from the second hardware components and the second intermediate minimum stored by the latch as input, and determining the minimum using a first set of 4 difference values from the second hardware components and the third intermediate minimum stored by the latch as input.

In some implementations of the hardware arrangement including the latch, the multiple pixel locations within the first area and the second search area are processed using a 1-stage process, the first search area comprises a 5×5 pixel area about a center pixel of the first prediction block, the second search area comprises a 5×5 pixel area about a center pixel of the second prediction block, the number of second hardware components comprises 2 second hardware components, each determining at least one difference value, the third hardware component is configured to determine the minimum of the respective difference values by determining a first intermediate minimum using a first set of 2 difference values from the second hardware component as input, determining a second intermediate minimum using a second set of 2 difference values from the second hardware components and the first intermediate minimum stored by the latch as input, determining a third intermediate minimum using a third set of 2 difference values from the second hardware components and the second intermediate minimum stored by the latch as input, determining a fourth intermediate minimum using a fourth set of 2 difference values from the second hardware components and the third intermediate minimum stored by the latch as input, determining a fifth intermediate minimum using a fifth set of 2 difference values from the second hardware components and the fourth intermediate minimum stored by the latch as input, determining a fifth intermediate minimum using a fifth set of 2 difference values from the second hardware component and the fourth intermediate minimum stored by the latch as input, determining a sixth intermediate minimum using a sixth set of 2 difference values from the second hardware components and the fifth intermediate minimum stored by the latch as input, determining a sixth intermediate minimum using a sixth set of 2 difference values from the second hardware components and the fifth intermediate minimum stored by the latch as input, determining a seventh intermediate minimum using a seventh set of 2 difference values from the second hardware components and the sixth intermediate minimum stored by the latch as inputs, determining an eighth intermediate minimum using an eighth set of 2 difference values from the second hardware components and the seventh intermediate minimum stored by the latch as input, determining a ninth intermediate minimum using a ninth set of 2 difference values from the second hardware components and the eighth intermediate minimum stored by the latch as input, determining a tenth intermediate minimum using a tenth set of 2 difference values from the second hardware components and the ninth intermediate minimum stored by the latch as input, determining an eleventh intermediate minimum using an eleventh set of 2 difference values from the second hardware components and the tenth intermediate minimum stored by the latch as input, determining a twelfth intermediate minimum using a twelfth set of 2 difference values from the second hardware components and the eleventh intermediate minimum stored by the latch as input, and determining the minimum using a thirteenth set of 2 difference values from the second hardware components and the twelfth intermediate minimum stored by the latch as input.

In some implementations of the hardware arrangement including the latch, the multiple pixel locations within the first area and the second search area are processed using a 2-stage process, the first search area comprises a 5×5 pixel area about a center of the first prediction block, the second search area comprises a 5×5 pixel area about a center of the second prediction block, the number of second hardware components comprises 5 second hardware components, each determining at least one difference value, and the third hardware component comprises two components, a first of the two components is configured to determine a first intermediate minimum from 5 difference values determined by the second hardware components using pixel locations in a 3×3 search area centered at the center of each of the first prediction block and the second prediction block as input, determine a second intermediate minimum using difference values from other pixel locations in the 3×3 search area centered at the center of each of the first prediction block and the second prediction block and the first intermediate minimum stored by the latch, and a second of the two components is configured to determine the minimum from the second intermediate minimum and up to 5 difference values determined by the second hardware components using remaining pixel locations of the 5×5 pixel area in a 3×3 search area centered at a pixel location where the second intermediate minimum value was determined as input.

In some implementations of the hardware arrangement including the latch, the multiple pixel locations within the first area and the second search area are processed using a 2-stage process, each of the first search area and the second search area comprises a 5×5 pixel area, the number of second hardware components comprises 5 second hardware components, each determining at least one difference value, and the third hardware component is configured to determine an intermediate minimum from 9 difference values determined by the second hardware components using pixel locations in a 3×3 search area centered at the center of each of the first prediction block and the second prediction block and determine the minimum using the intermediate minimum stored by the latch and up to 5 difference values determined by the second hardware components using remaining pixel locations of the 5×5 pixel area in a 3×3 search area centered at a pixel location where the first intermediate minimum value was determined as input.

In some implementations of the hardware arrangement, the multiple pixel locations within the first area and the second search area are processed using a 1-stage process, the first search area comprises a 5×5 pixel area about a center of the first prediction block, the second search area comprises a 5×5 pixel area about a center of the second prediction block, the number of second hardware components comprises 25 second hardware components, each determining a single difference value, and the third hardware component is configured to determine the minimum of 25 difference values output from the 25 second hardware components as input.

In some implementations of the hardware arrangement, the multiple pixel locations within the first area and the second search area are processed using a 2-stage process, the first search area comprises a 5×5 pixel area about a center of the first prediction block, the second search area comprises a 5×5 pixel area about a center of the second prediction block, the number of second hardware components comprises a first set of second hardware components and a second set of second hardware components, each determining a difference value, and the third hardware component comprises two components, a first of the two components is configured to determine an intermediate minimum value from 9 difference values determined by the first set of hardware components using pixel locations in a 3×3 search area centered at the center of each of the first prediction block and the second prediction block, and a second of the two components is configured to determine the minimum of up to 5 difference values determined by the second set of hardware components using remaining pixel locations of the 5×5 pixel areas in a 3×3 search area centered at a pixel location where the intermediate minimum value was determined and the intermediate minimum value as input.

In some implementations of the hardware arrangement, the third hardware component is one or more comparators.

In some implementations of the hardware arrangement, the third hardware component is configured to determine a respective minimum value of a difference value and a previous difference value.

The hardware arrangement may include a state machine controller configured to select pixel values from the buffer for input into the second hardware components.

In some implementations of the hardware arrangement, each of the difference values is a sum of absolute differences, a mean square error, or some combination thereof.

In some implementations of the hardware arrangement, the minimum of the respective difference values is selected using a 2-stage process, and the number of second hardware components comprises fewer than a number of pixels defining the first search area.

Another aspect of the teachings herein is a hardware decoder including any of the hardware arrangement described herein, where the fourth hardware component is a multiplexer having an output including the first refined motion vector, the second refined motion vector, the refined first prediction block, and the refined second prediction block, and also including a reconstruction stage configured to reconstruct the sub-block of the current block using the output of the multiplexer.

The hardware decoder may include an entropy decoding stage configured to decode the first initial MV and the second initial MV from a header of the current block.

These and other aspects of the present disclosure are disclosed in the following detailed description of the embodiments, the appended claims, and the accompanying figures.

BRIEF DESCRIPTION OF THE DRAWINGS

The description herein refers to the accompanying drawings described below wherein like reference numerals refer to like parts throughout the several views.

FIG. 12 is an example of a flowchart of a technique for coding a current block.

DETAILED DESCRIPTION

Figure 1:
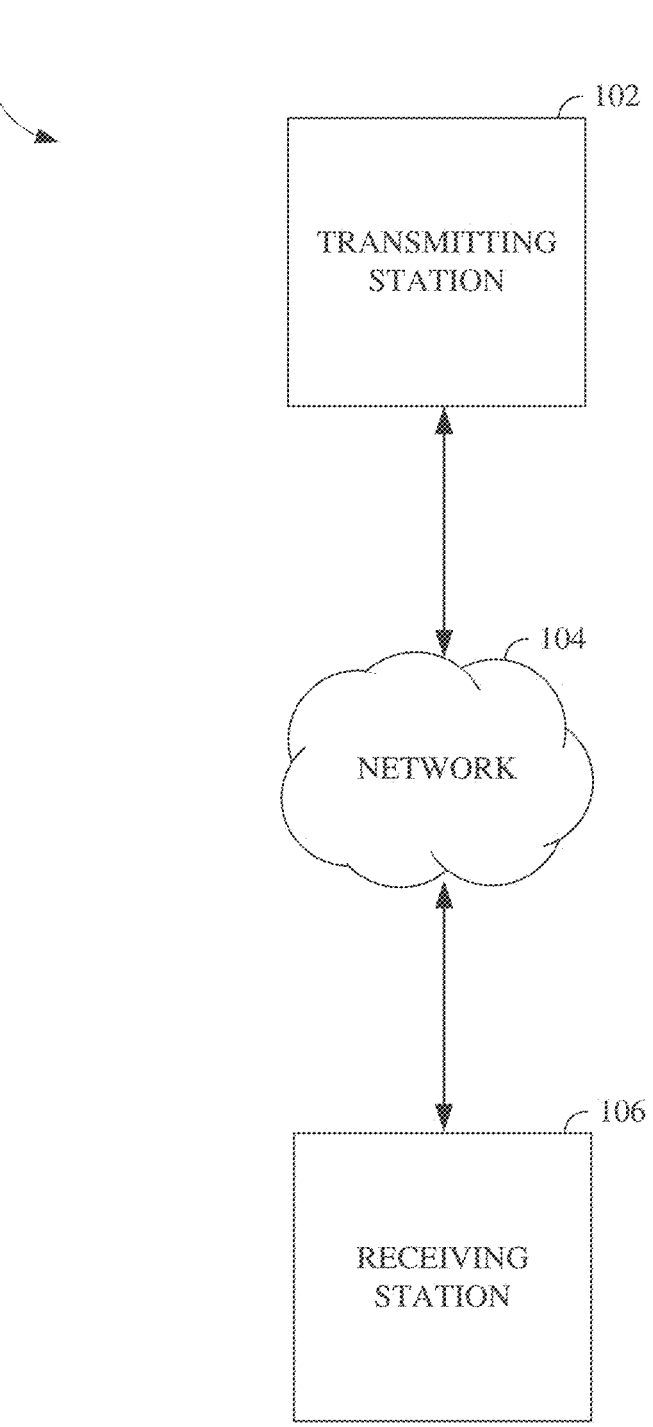
FIG. 1 is a schematic of a video encoding and decoding system.

As mentioned, compression schemes related to coding video streams may include breaking images into blocks and generating a digital video output bitstream (i.e., an encoded bitstream) using one or more techniques to limit the information included in the output bitstream. A received bitstream can be decoded to re-create the blocks and the source images from the limited information. Encoding a video stream, or a portion thereof, such as a frame or a block, can include using temporal similarities in the video stream to improve coding efficiency. For example, a current block of a video stream may be encoded based on identifying a difference (residual) between the previously coded pixel values, or between a combination of previously coded pixel values, and those in the current block.

Encoding using temporal similarities is known as inter prediction or motion-compensated prediction (MCP). A prediction block of a current block (i.e., a block being coded) is generated by finding a corresponding block in a reference frame following a motion vector (MV). That is, inter prediction attempts to predict the pixel values of a block using a possibly displaced block or blocks from a temporally nearby frame (i.e., a reference frame) or frames. A temporally nearby frame is a frame that appears earlier or later in time in the video stream than the frame (i.e., the current frame) of the block being encoded (i.e., the current block). An MV used to generate a prediction block refers to (e.g., points to or is used in conjunction with) a frame (i.e., a reference frame) other than the current frame. An MV may be defined to represent a block or pixel offset between the reference frame and the corresponding block or pixels of the current frame.

Inter prediction can be performed either from a single reference frame or from two or more reference frames. Inter prediction modes that perform motion compensation from two or more reference frames may be referred to as compound inter-prediction modes (or compound modes, for brevity). In compound modes, multiple MVs can be signaled to (or may be derived from a list of candidate MVs at) the decoder. For example, the motion vector(s) for a current block may be encoded into, and decoded from, a compressed bitstream. If all reference frames are, in display order, located on the same side from the current frame, the prediction mode may be referred to as a unidirectional prediction mode. If one of the reference frames is in the backward direction and another reference frame is in the forward direction in the display order, the compound mode may be referred to as bidirectional prediction mode.

A motion vector for a current block is described with respect to a co-located block in a reference frame. The motion vector describes an offset (i.e., a displacement) in the horizontal direction (i.e., $MV_x$) and a displacement in the vertical direction (i.e., $MV_y$) from the co-located block in the reference frame. As such, an MV can be characterized as a 3-tuple (f, $MV_x$, $MV_y$) where f is indicative of (e.g., is an index of) a reference frame, $MV_x$ is the offset in the horizontal direction from a collocated position of the reference frame, and $MV_y$ is the offset in the vertical direction from the collocated position of the reference frame. As such, at least the offsets $MV_x$ and $MV_y$ are written (i.e., encoded) into the compressed, or encoded, bitstream and read (i.e., decoded) from the encoded bitstream.

As is known, there is generally a need to construct a list of candidate MVs and to code an index of a reference MV (i.e., a selected MV) in the list of candidate MVs. That is, at the encoder, the list of candidate MVs may be constructed according to predetermined rules and an index of a selected MV candidate may be encoded in a compressed bitstream; and, at the decoder, the list of candidate MVs may be constructed (e.g., generated) according to the same predetermined rules and the index of the selected MV candidate may be decoded from the compressed bitstream. In some situations (such as based on the inter prediction mode), it may not be necessary for the encoder to encode an index of an MV; rather, the index of the selected MV may be inferred at the decoder. In either case, before decoding an inter-predicted block, at first a list of candidate MVs is generated (such as, amongst others, from neighboring blocks and collocated blocks). The list of candidate MVs contains a list of reference MVs of a current block.

To lower the cost of encoding the motion vectors (e.g., reduce the number of bits), a motion vector may be encoded differentially. Namely, a predicted motion vector (PMV) may be selected as a reference motion vector, and only a difference or residue (also called the motion vector difference (MVD)) between the motion vector (MV) of a current block and the reference motion vector is encoded into the bitstream. The reference (or predicted) motion vector may be a motion vector of one of the neighboring blocks, for example, and may be selected from the list of candidate MVs. Thus, MVD=MV−PMV. The neighboring blocks can include spatial neighboring blocks (i.e., blocks in the same current frame as the current block). The neighboring blocks can include temporal neighboring blocks (i.e., blocks in frames other than the current frame). An encoder codes the MVD in the bitstream; the encoder may also code an index for the PMV in the list of candidate MVs in the bitstream; and a decoder decodes the MVD from the bitstream and adds it to the reference or predicted motion vector (PMV) to obtain the motion vector (MV) of a current block.

As alluded to above, coding an MV may include coding the horizontal offset (i.e., $MV_x$) and coding the vertical offset (i.e., $MV_y$) of the MV or coding the horizontal offset (i.e., $MVD_x$) and coding the vertical offset (i.e., $MVD_y$) of the MVD. When implemented by an encoder, "coding" means encoding in a bitstream. When implemented by a decoder, "coding" means decoding from a bitstream.

To reduce the number of bits required to code motion information (including motion vector information) and improve prediction accuracy, sub-block based motion vector refinement, which is a decoder-side motion-vector derivation (DMVD) technique, can be used to obtain, at the decoder, refined motion information for sub-blocks of a current block that is coded using a compound inter-prediction mode. The compound inter-prediction can be a unidirectional or a bidirectional inter-prediction mode. Initial MVs (i.e., $MV_0$ and $MV_1$) may be identified (e.g., selected) for the current block. The block can be partitioned into sub-blocks. Refined motion vectors can be obtained for the sub-blocks based on the initial MVs. Each of the sub-blocks is then encoded or decoded using its obtained refined motion vectors.

If a current block is coded as compound mode (e.g., bi-directional or uni-directional where at least one reference frame is a forward reference or a backward reference frame), motion vectors of the sub-blocks of the current block are refined before producing the final prediction. Sub-block based motion vector refinement includes dividing a current block into k non-overlapping sub-blocks. For each sub-block, offset MVs are obtained that correspond to a difference value from the reference frame at multiple pixel location. Then, optimal offset MVs (denoted $\Delta MV_0$ and $\Delta MV_1$) are derived. Refined MVs (denoted $RefinedMV_0$ and $RefinedMV_1$) for a sub-block are computed by adding the optimal offset MVs obtained for the sub-block with the initial MV, which may be signaled or derived from the list of candidate MVs. More specifically, one of the optimal offset MVs may be added to one of the initial motion vectors and subtracted from the other initial motion vector.

Due to the refinement of the motion vectors in this technique, it is also referred to herein as decoder-side motion vector refinement (DMVR). Further details of DMVR are described herein with initial reference to a system in which it can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figures 2, 3:
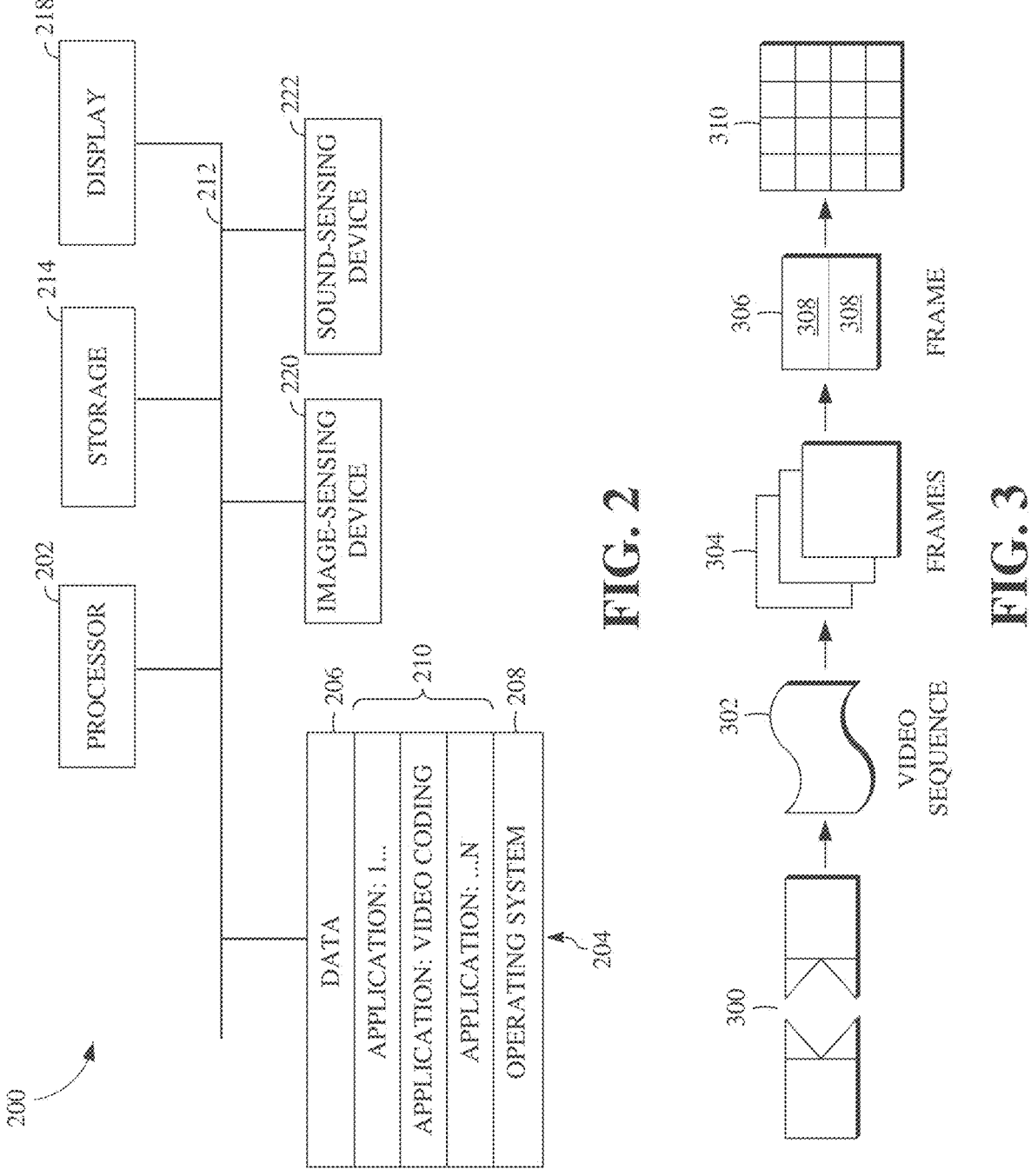
FIG. 2 is a block diagram of an example of a computing device that can implement a transmitting station or a receiving station.
FIG. 3 is a diagram of an example of a video stream to be encoded and subsequently decoded.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a video streaming protocol based on the Hypertext Transfer Protocol (HTTP).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 (e.g., an apparatus) that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random-access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macro-block are used interchangeably herein.

Figure 4:
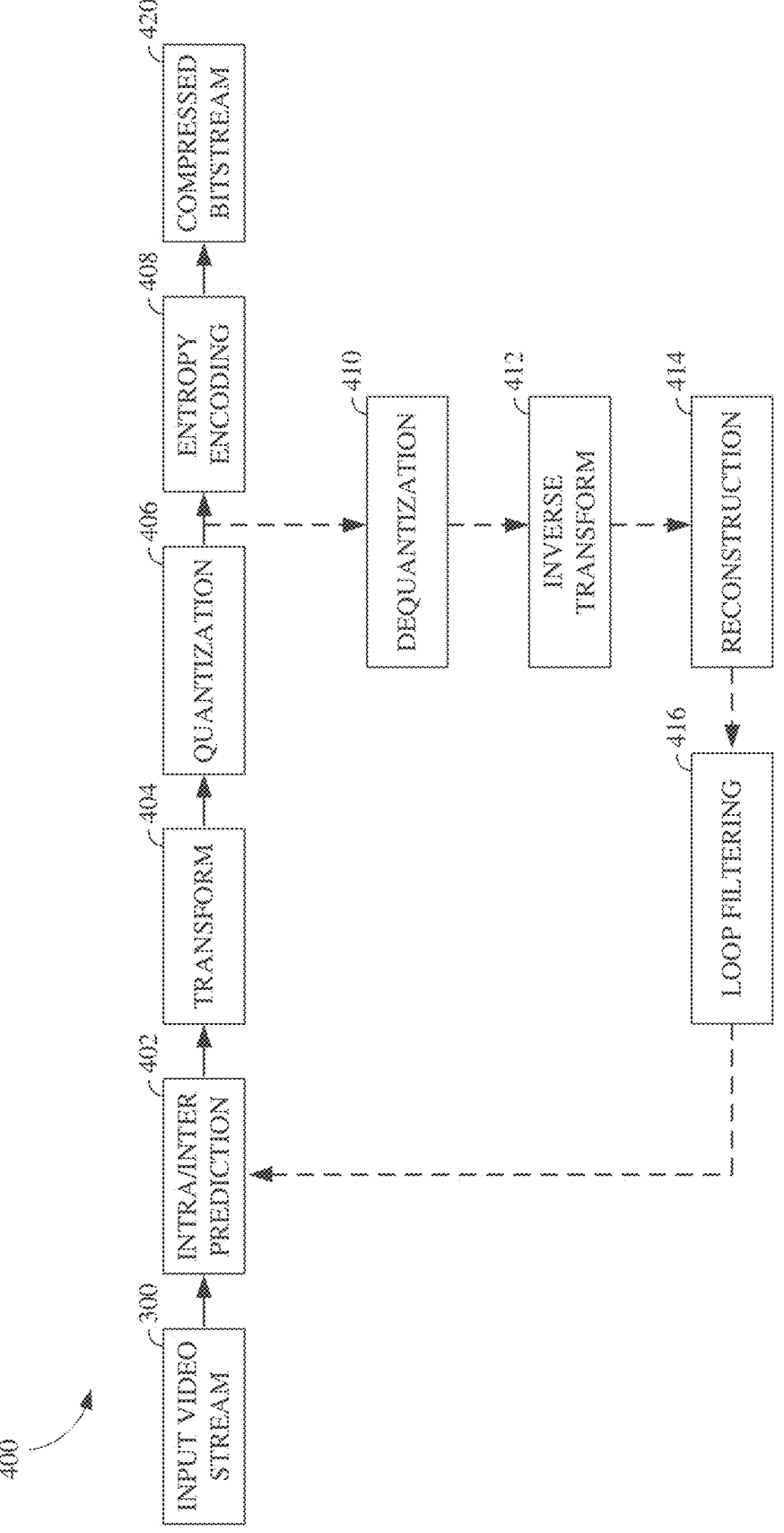
FIG. 4 is a block diagram of an encoder.

FIG. 4 is a block diagram of an encoder 400. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform-based encoder can quantize the residual signal directly without the transform stage 404 for certain blocks or frames. In another implementation, an encoder can have the quantization stage 406 and the dequantization stage 410 combined in a common stage.

Figure 5:
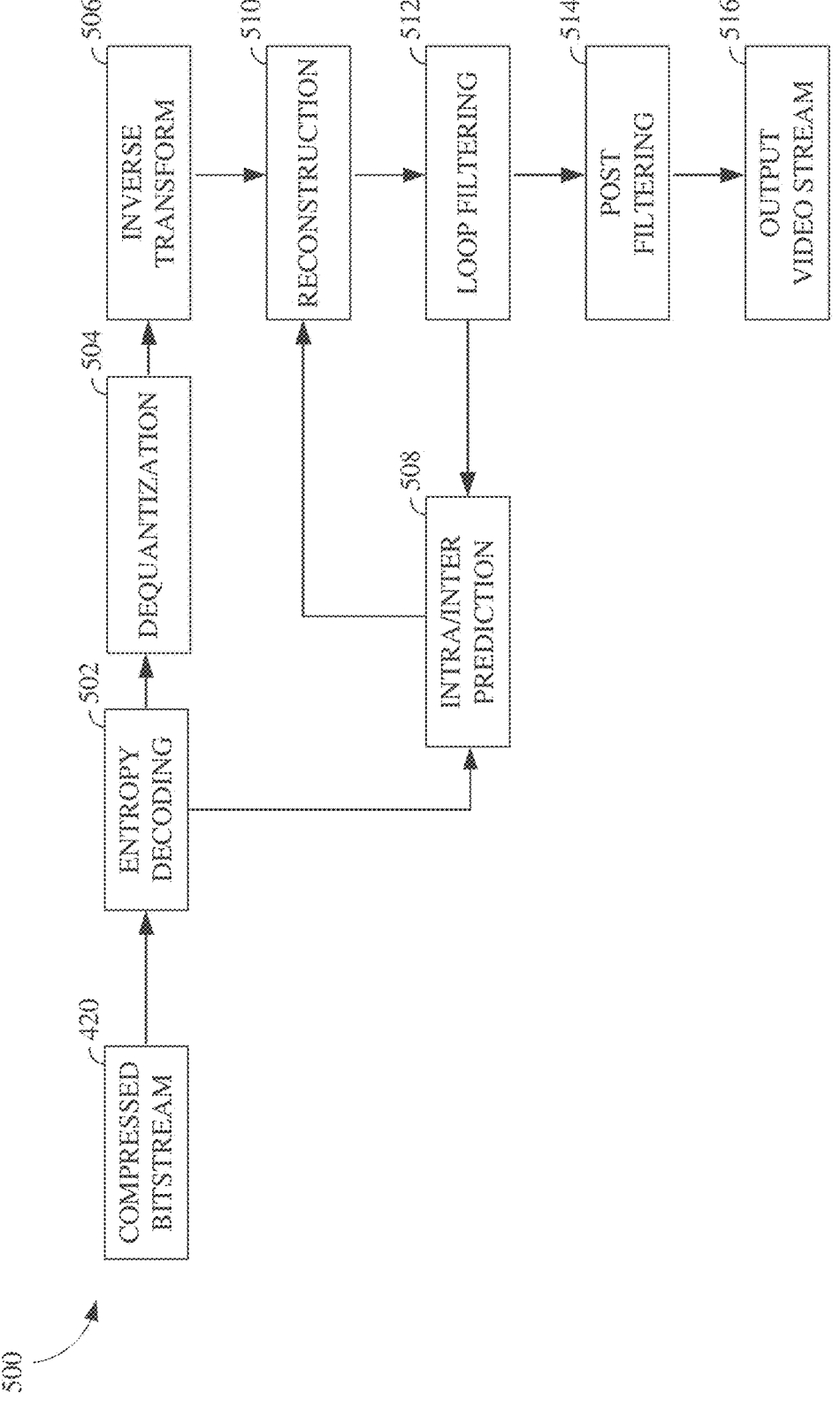
FIG. 5 is a block diagram of a decoder.

FIG. 5 is a block diagram of a decoder 500. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a post-loop filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the post-loop filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the post-loop filtering stage 514.

Figure 6:
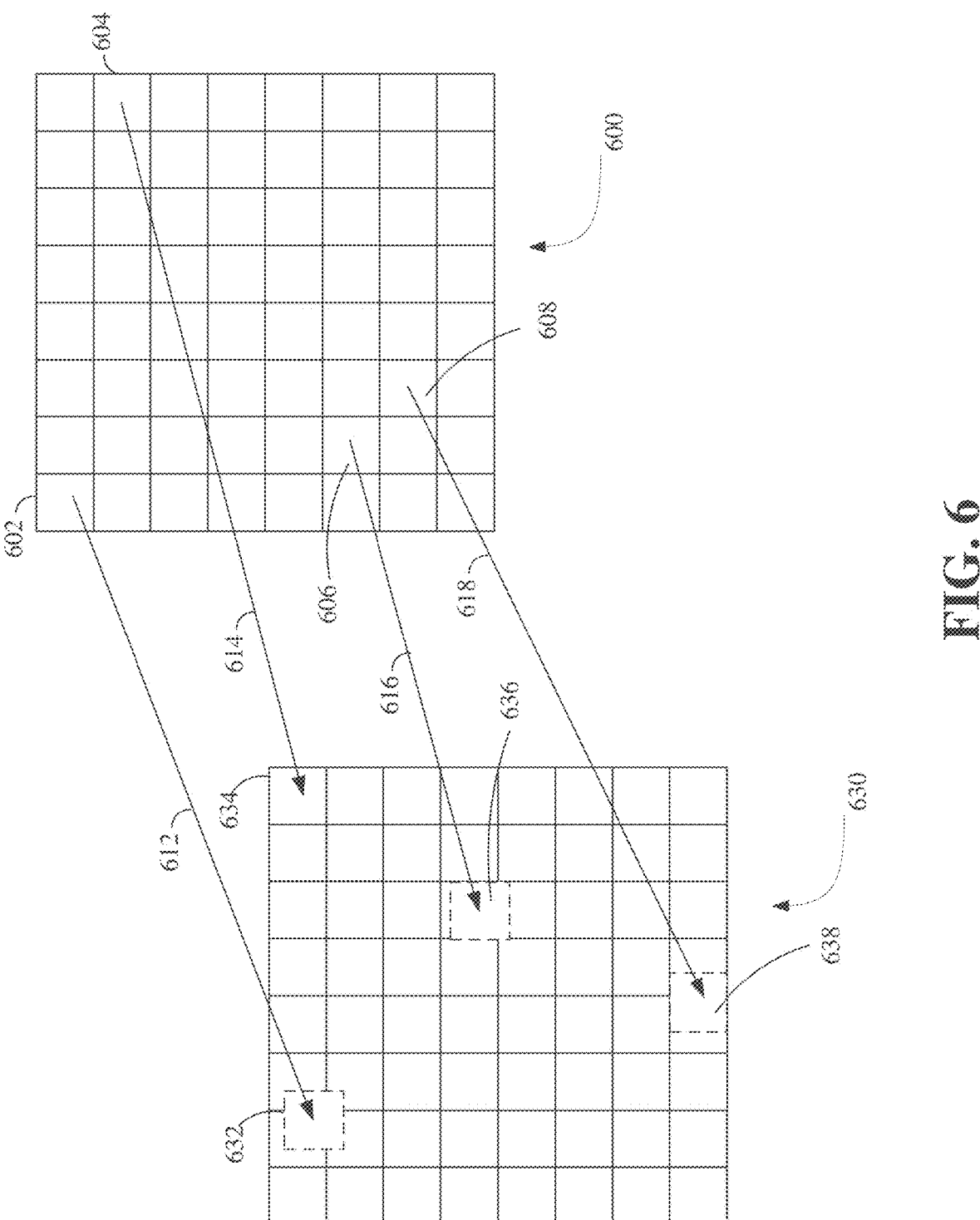
FIG. 6 is a diagram of motion vectors representing full and sub-pixel motion.

FIG. 6 is a diagram of motion vectors representing full and sub-pixel (or sub-pel) motion. In FIG. 6, several blocks 602, 604, 606, 608 of a current frame 600 are inter predicted using pixels from a reference frame 630. In this example, the reference frame 630 is a temporally adjacent frame in a video sequence including the current frame 600, such as the video stream 300. The reference frame 630 is a reconstructed frame (i.e., one that was encoded and has been decoded, such as by a decoder 500) stored in a (e.g., last) reference frame buffer and is available for coding blocks of the current frame 600. Other (e.g., reconstructed) frames, or portions of such frames may also be available for inter prediction. Other available reference frames may include a golden frame, which is another frame of the video sequence that may be selected (e.g., periodically) according to any number of techniques, and a constructed reference frame, which is a frame that is constructed from one or more other frames of the video sequence but is not shown as part of the decoded output, such as the output video stream 516 of FIG. 5.

A prediction block 632 for encoding the block 602 corresponds to (is identified by) a motion vector 612. A prediction block 634 for encoding the block 604 corresponds to a motion vector 614. A prediction block 636 for encoding the block 606 corresponds to a motion vector 616. Finally, a prediction block 638 for encoding the block 608 corresponds to a motion vector 618. Each of the blocks 602, 604, 606, 608 is inter predicted using a single motion vector and hence a single reference frame in this example, but the teachings herein also apply to inter prediction using more than one motion vector (such as bi-predictional and/or compound prediction using two different reference frames), where pixels from each prediction are combined in some manner to form a prediction block.

As mentioned above, a list of candidate MVs may be generated according to predetermined rules. The predetermined rules for generating (e.g., deriving, or constructing and ordering) the list of candidate MVs and the number of candidates in the list may vary by codec. For example, in High Efficiency Video Coding (H.265), the list of candidate MVs can include up to 5 candidate MVs.

Codecs may populate the list of candidate MVs using different algorithms, techniques, or tools (collectively, tools). Each of the tools may produce a group of MVs that are added to the list of candidate MVs. For example, in Versatile Video Coding (H.266), the list of candidate MVs may be constructed using several modes, including intra-block copy (IBC) merge, block level merge, and sub-block level merge. The details of these modes are not necessary for the understanding of this disclosure. H.266 limits the number of candidate MVs obtained using IBC merge, block-level merge, and sub-block level merge, to 6 candidates, 6 candidates, and 5 candidates, respectively. Different codecs may use different techniques for generating lists of candidate MVs. Additionally, different modes of a codec may use different lists of candidate MVs. However, such nuances are not necessary for the understanding of this disclosure. As such, the disclosure merely assumes use of a list of candidate MVs.

Figure 7B:
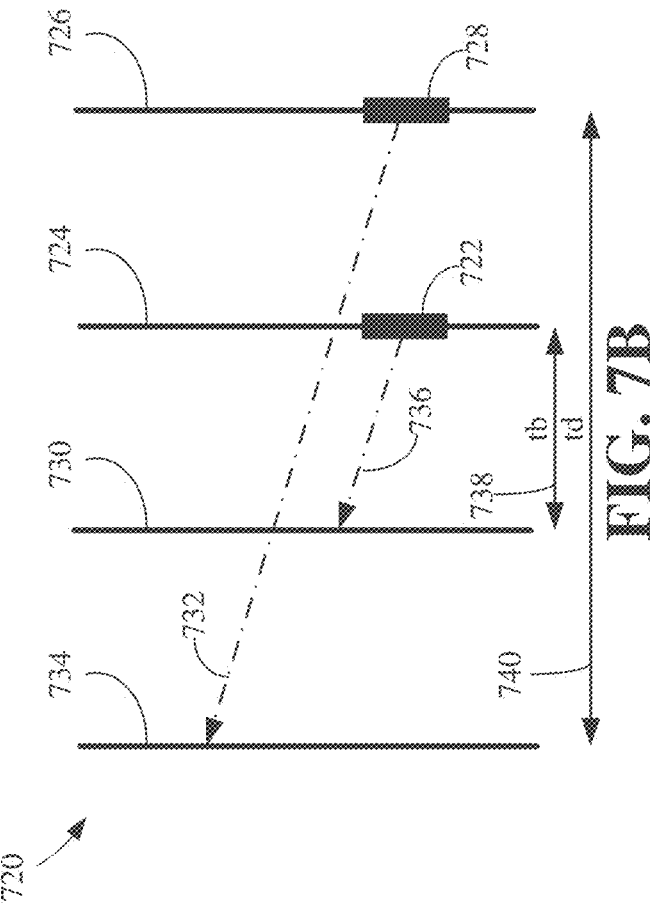
FIG. 7B illustrates an example of generating a group of motion vector candidates for a current block based on temporal neighbors of the current block.
Figure 7A:
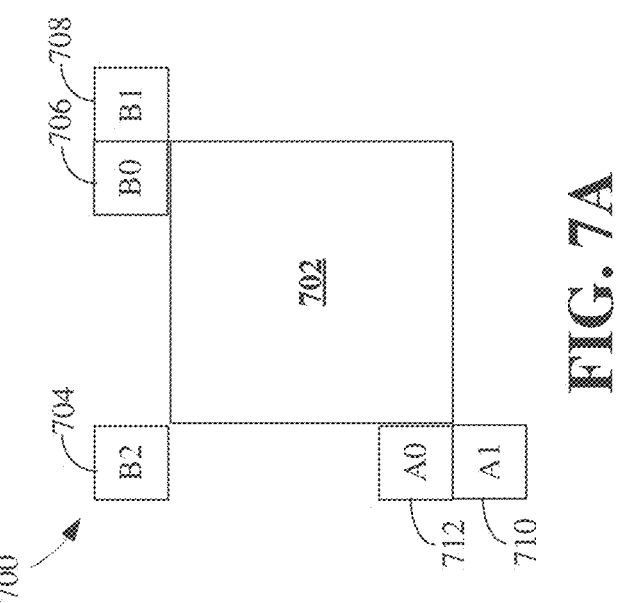
FIG. 7A illustrates an example of generating a group of motion vector candidates for a current block based on spatial neighbors of the current block.
Figure 7C:
FIG. 7C illustrates an example of generating a group of motion vector candidates for a current block based on non-adjacent spatial candidates of the current block.

FIGS. 7A-7C illustrate examples of tools for generating groups of motion vectors. As mentioned above, a list of candidate MVs may be obtained using different tools. An encoder, such as the encoder 400 of FIG. 4, and a decoder, such as the decoder 500 of FIG. 5, may use the same tools for obtaining (e.g., populating, constructing, etc.) the same list of candidate MVs. The candidate MVs obtained using a tool are referred to herein as a group of candidate MVs. At least some of the tools described herein may be known or may be similar to or used by other codecs. However, the disclosure is not limited to or by any particular tools that can generate groups of MV candidates. The groups of motion vectors may be or may be combined to form a list of candidate MVs.

As mentioned above, merge candidates or candidate MVs may be derived using different tools. Some such tools are now described. Depending on the inter-prediction mode, different motion information may be coded in an encoded or compressed bitstream, such as the compressed bitstream 420 of FIGS. 4 and 5. For example, if a block is coded using the MERGE mode, a reference frame index and a motion vector of the list of candidate MVs are set as the reference frame index and motion vector of the block. A merge candidate corresponding to a merge index (e.g., the index of the candidate in the list of candidate MVs) is selected from the merge candidate list and the motion information of the merge candidate is set as the motion information of the block. The merge index (e.g., the index of the candidate in the list of candidate MVs) may be coded in the bitstream. For example, if a motion vector is coded differentially, an MVP is selected from list of candidate MVs. The index of the MVP in the list of candidate MVs may be included in the bitstream. The MVD may also be included (i.e., coded) in the bitstream. Additionally, a reference frame index may also be included (i.e., coded) in the bitstream.

FIG. 7A illustrates an example 700 of generating a group of motion vector candidates for a current block based on spatial neighbors of the current block. The example 700 may be referred to or may be known as generating or deriving spatial merge candidates. The spatial merge mode may be limited to merging with spatially-adjacent blocks in the same picture.

A current block 702 may be "merged" with one of its spatially available neighboring block(s) to form a "region." FIG. 7A illustrates that spatially available neighboring blocks include blocks 704-712 (i.e., blocks 704, 706, 708, 710, 712). As such, up to six MV candidates (i.e., corresponding to the MVs of the blocks 704-712) may be possible (i.e., added to the list of candidate motion vectors or the merge list). However, more or fewer spatially neighboring blocks may be considered. In an example, a maximum of four merge candidates may be selected from amongst candidate blocks 704-712.

All pixels within the merged region share the same motion parameters (e.g., the same MV(s) and reference frame(s)). Thus, there is no need to code and transmit motion parameters for each individual block of the region. Instead, for a region, only one set of motion parameters is encoded and transmitted from the encoder and received and decoded at the decoder. In an example, a flag (e.g., merge_flag) may be used to specify whether the current block is merged with an available neighboring block. Additionally, an index of the MV candidate in the list of MV candidates of the neighboring block with which the current block is merged.

FIG. 7B illustrates an example 720 of generating a group of motion vector candidates for a current block based on temporal neighbors of the current block. The example 720 may be referred to or may be known as generating or deriving temporal merge candidates or as a temporal merge mode. In an example, the temporal merge mode may be limited to merging with temporally co-located blocks in neighboring frames. In another example, blocks in reference frames other than a co-located block may also be used.

A co-located block may be a block that is in the same or a similar position (e.g., within a range of pixels) in a reference frame as the current block. Any number of co-located blocks can be used. That is, the respective co-located blocks in any number of previously coded pictures can be used. In an example, the respective co-located blocks in all previously coded frames of the same group of pictures (GOP) as the frame of the current block are used. Motion parameters of the current block may be derived from temporally located blocks and used in the temporal merge.

The example 720 illustrates that a current block 722 of a current frame 724 is being coded. A frame 726 is a previously coded frame, a block 728 is a co-located block in the frame 726 to the current block 722, and a frame 730 is a reference frame for the current frame. A motion vector 732 is the motion vector of the block 728. The frame 726, which includes the co-located block 728, may be referred to as the "collocated picture" or "collocated frame." The motion vector 732 points to a reference frame 734. The reference frame 734, which is the reference frame of the collocated picture, may be referred to as the "collocated reference picture" or the "collocated reference frame." As such, a motion vector 736, which may be a scaled version of the motion vector 732, can be used as a candidate MV for the current block 722. The motion vector 732 can be scaled by a distance 738 (denoted tb) and a distance 740 (denoted td). The distance can be the picture order count (POC) or the display order of the frames. As such, in an example, tb can be defined as the POC difference between the reference frame (i.e., the frame 730) of the current frame (i.e., the current frame 724) and the current frame; and td is defined to be the POC difference between the reference frame (i.e., the reference frame 734) of the co-located frame (i.e., the frame 726) and the co-located frame (i.e., the frame 726).

FIG. 7C illustrates an example 750 of generating a group of motion vector candidates for a current block 752 based on non-adjacent spatial candidates of the current block. A current block 752 illustrates a largest coding unit (which may be further divided into sub-blocks), which may be divided into sub-blocks and where at least some of the sub-blocks may be inter predicted. Blocks that are filled with the black color, such as a block 754, illustrate the neighboring blocks described with respect to FIG. 7A. Blocks filled with the dotted pattern, such as blocks 756, 758 are used for obtaining the group of motion vector candidates for the current block 752 based on non-adjacent spatial candidates.

An order of evaluation of the non-adjacent blocks may be predefined. The group of candidate MVs based on non-adjacent spatial candidates may include 5, 10, fewer, or more MV candidates.

Another example (not illustrated) of generating a group of MV candidates (or merge candidates) for a current block can be history based MV derivation, which may be referred to as history based MV prediction (HMVP) mode.

In the HMVP mode, the motion information of a previously coded block can be stored in a table and used as a candidate MV for a current block. The table with multiple HMVP candidates can be maintained during the encoding/decoding process. The table can be reset (emptied) when a new row of largest coding units (which may be referred to as a superblock or a macroblock) is encountered.

In an example, the HMVP table size may be set to 6, which indicates that up to 6 HMVP candidate MVs may be added to the table. When inserting a new candidate MV into the table, a constrained first-in-first-out (FIFO) rule may be utilized wherein redundancy check is firstly applied to find whether there is an identical HMVP in the table. If found, the identical HMVP is removed from the table and all the HMVP candidates afterwards are moved forward, and the identical HMVP is inserted to the last entry of the table.

HMVP candidates could be used in the merge candidate list construction process. The latest several HMVP candidates in the table can be checked in order and inserted to the candidate MV list after the temporal merge candidate. A codec may apply redundancy check on the HMVP candidates to the spatial or temporal merge candidate(s).

Yet another example of generating a group of candidate MVs for a current block can be based on averaging predefined pairs of MV candidates in the already generated groups of MV candidates of the list of MV candidates.

Pairwise average MV candidates can be generated by averaging predefined pairs of candidates in the existing merge candidate list, using motion vectors of already generated groups of MVs. The first merge candidate is defined as p0Cand and the second merge candidate can be defined as p1Cand, respectively. The averaged motion vectors are calculated according to the availability of the motion vector of p0Cand and p1Cand separately for each reference list. If both motion vectors are available in one list, these two motion vectors can be averaged even when they point to different reference frames, and the reference frame for the average MV can be set to be the same reference frame as that of p0Cand. If only one MV is available, that one can be used directly. If no motion vector is available, the list may be kept in an invalid state (e.g., designated to not use). Also, if half-pel interpolation filter indices of p0Cand and p1Cand are different, the half-pel interpolation filter may be set to 0.

In yet another example, a group of zero MVs may be generated. A current reference frame of a current block may use one of N reference frames. A zero MV is a motion vector with displacement (0, 0). The group of zero MVs may include 0 or more zero MVs with respect to at least some of the N reference frames.

It is again noted that the tools described herein for generating groups of candidate MVs does not limit the disclosure in any way and that different codecs may implement such tools differently or may include fewer or more tools for generating candidate MVs and/or merge candidates.

To summarize, a conventional codec may generate a list of candidate MVs using different tools. Each tool may be used to generate a respective group of candidate MVs. Each group of candidate MVs may include one or more candidate MVs. The candidate MVs of the groups are appended to the list of candidate MVs in a predefined order. The list of candidate MVs has a finite size, and the tools are used until the list is full. For example, the list of candidate MVs may be of size 6, 10, 15, or some other size. For example, spatial merge candidates may be first be added to the list of candidate MVs. If the list is not full, then at least some of temporal merge candidates may be added. If the list is still not full, then at least some of the HMVP candidates may be added. If the list is still not full, then at least some of the pairwise average MV candidates may be added. If the list is still not full, then zero MVs may be added. The size of the list of candidate MVs may be signaled in the bitstream, and the maximum allowed size of the merge list may be predefined. For each coding unit, an index of the best merge candidate may be encoded using truncated unary binarization. In an example, the first bin of the merge index may be coded with context and bypass coding may be used for other bins.

As mentioned briefly above, conventional codecs may perform redundancy checks so that the same motion vector is not added more than once in the same group of candidate MVs. To illustrate, after the candidate at position $A_1$ of FIG. 7A (i.e., the block 710) is added, the addition of the remaining candidates may be subject to a redundancy check to ensure that candidates with the same motion information are excluded from the list. As another illustration, redundancy checks may be applied on the HMVP candidates with the spatial or temporal merge candidates. In some codecs, and to reduce the number of redundancy check operations, simplifications may be introduced, such as, once the total number of available merge candidates reaches the maximally allowed merge candidates minus 1, the merge candidate list construction process from HMVP is terminated.

Figure 8:
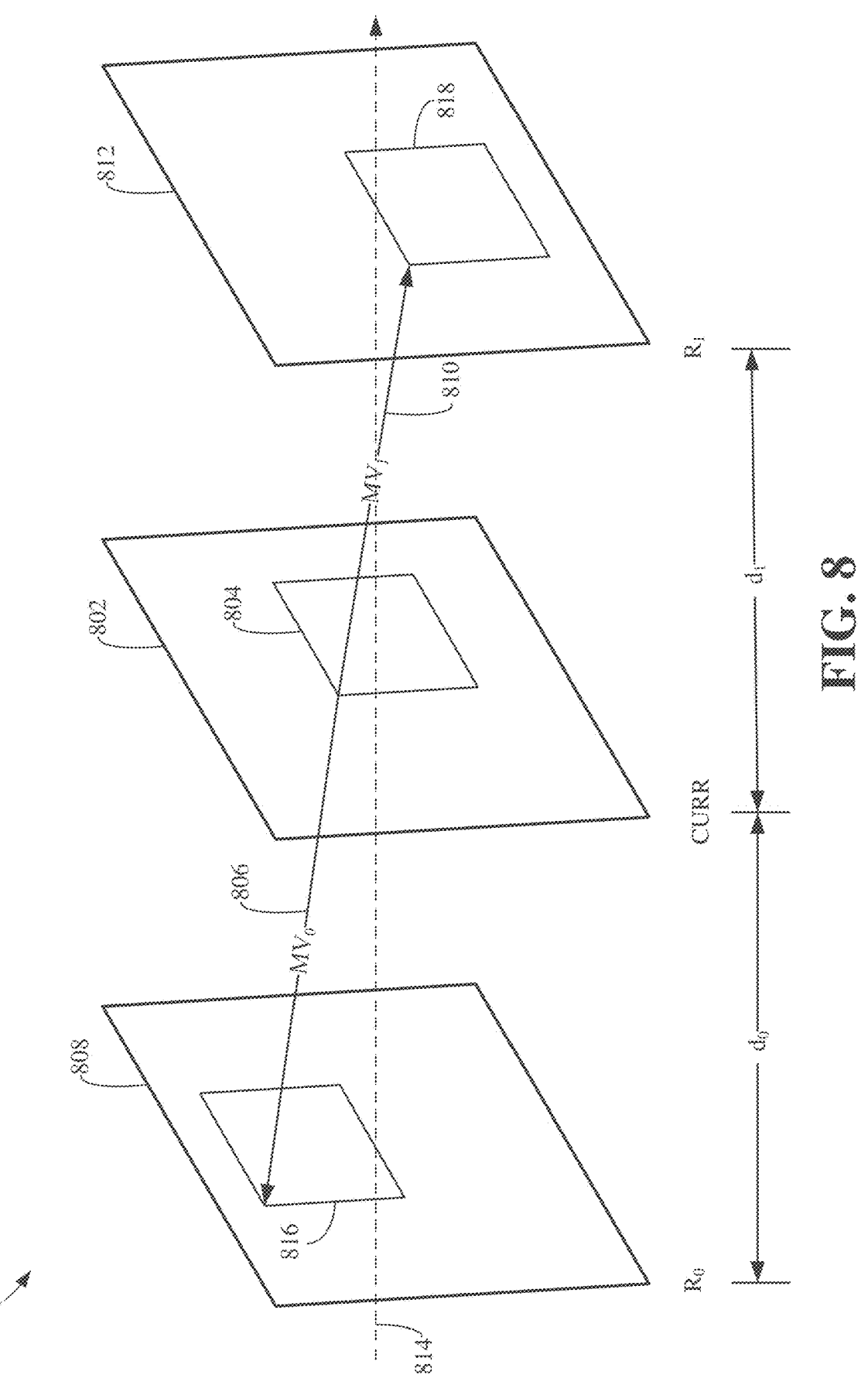
FIG. 8 is an illustration of compound inter-prediction.

FIG. 8 is an illustration 800 of compound inter-prediction. The illustration 800 includes a current frame 802 that includes a current block 804 to be coded (i.e., encoded or decoded) using a first MV 806 (i.e., $MV_0$) that refers (i.e., points) to a first reference frame 808 (i.e., $R_0$) and a second MV 810 (i.e., $MV_1$) that refers to a second reference frame 812 (i.e., $R_1$). A line 814 illustrates the display order, in time, of the frames. As such, the illustration 800 is an example of a bi-directional prediction because the current frame 802 is between the first reference frame 808 and the second reference frame 812 in the display order. However, the disclosure herein is not limited to bi-directional prediction, and the techniques described herein can also be used with (e.g., adapted to) uni-directional prediction.

The distance, in display order, between the first reference frame 808 and the current frame 802 is denoted $d_0$, and the distance, in display order, between the current reference frame 802 and the second reference frame 812 is denoted $d_1$. While not specifically shown in FIG. 8, each of the first MV 806 and the second MV 810 includes a horizontal and vertical offset. Thus, $MV_{0,x}$ and $MV_{0,y}$ can denote, respectively, the horizontal and the vertical components of the first MV 806, and $MV_{1,x}$ and $MV_{1,y}$ can denote, respectively, the horizontal and the vertical components of the second MV 810. The first MV 806 and the first reference frame 808 can be used to obtain a first prediction block 816 (denoted $P_0$) for the current block 804, and the second MV 810 and the second reference frame 812 can be used to obtain a second prediction block 818 (denoted $P_1$) for the current block 804. A final prediction block for the current block 804 can be obtained as a combination (e.g., a pixel-wise weighted average) of the first prediction block 816 and the second prediction block 818.

Figure 9:
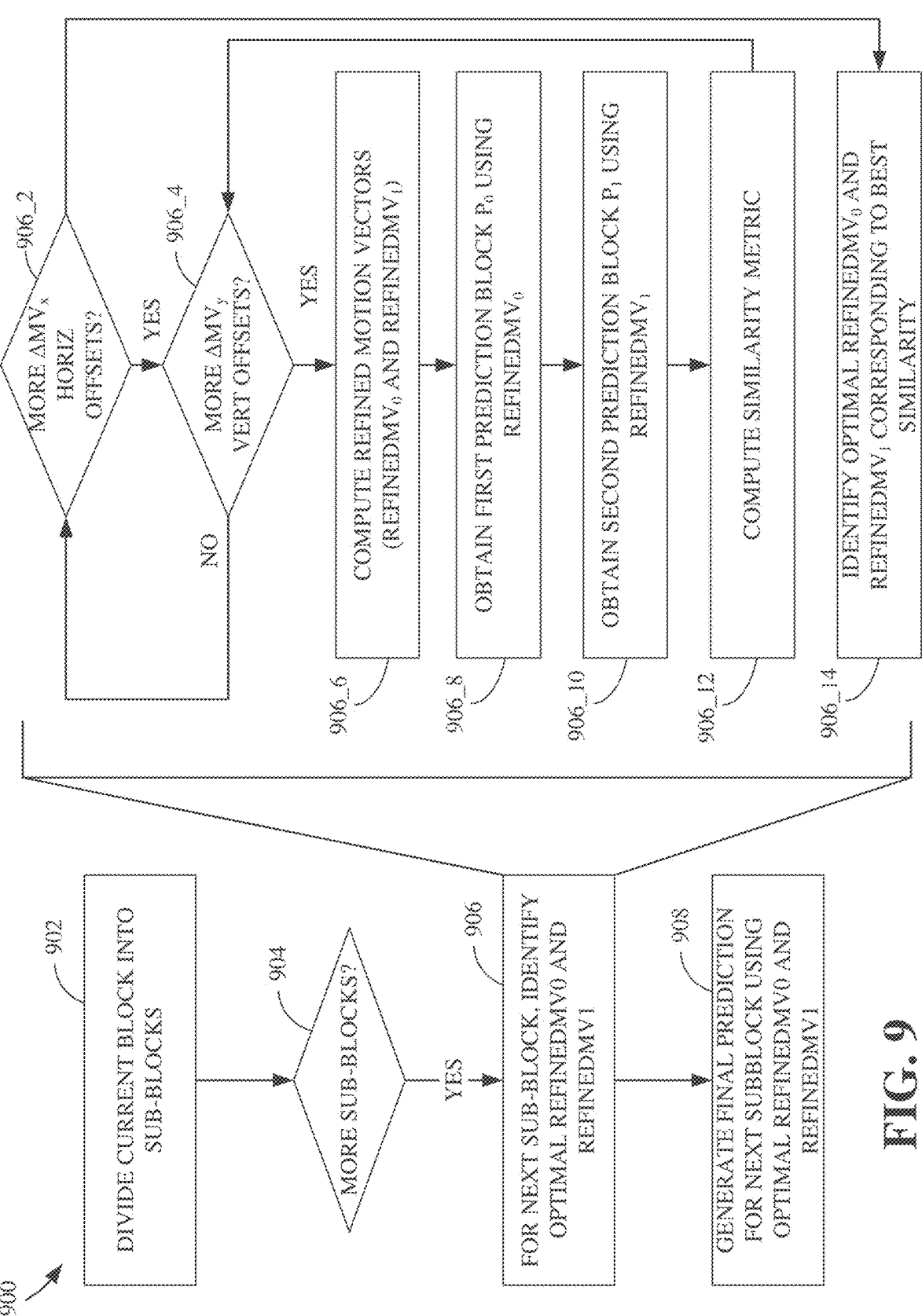
FIG. 9 is a flowchart of an example of a technique for identifying offset motion vectors for sub-blocks of a current block.

FIG. 9 is a flowchart of an example of a technique 900 for identifying offset motion vectors for sub-blocks of a current block. The technique 900 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the technique 900. The technique 900 may be implemented in whole or in part in the intra/inter prediction stage 402 of the encoder 400 of FIG. 4 and/or the intra/inter prediction stage 508 of the decoder 500 of FIG. 5. The technique 900 can be implemented using specialized hardware or firmware. Multiple processors, memories, or both, may be used.

While not specifically shown in FIG. 9, initial motion vectors (i.e., a first motion vector $MV_0$ and a second motion vector $MV_1$) are assumed to have been identified for the current block. In an example, and when implemented by a decoder, the initial motion vectors $MV_0$ and $MV_1$ can be identified based on one or more syntax elements decoded from a compressed bitstream. The disclosure is not limited to or by any particular way of identifying the initial motion vectors $MV_0$ and $MV_1$.

Figure 10:
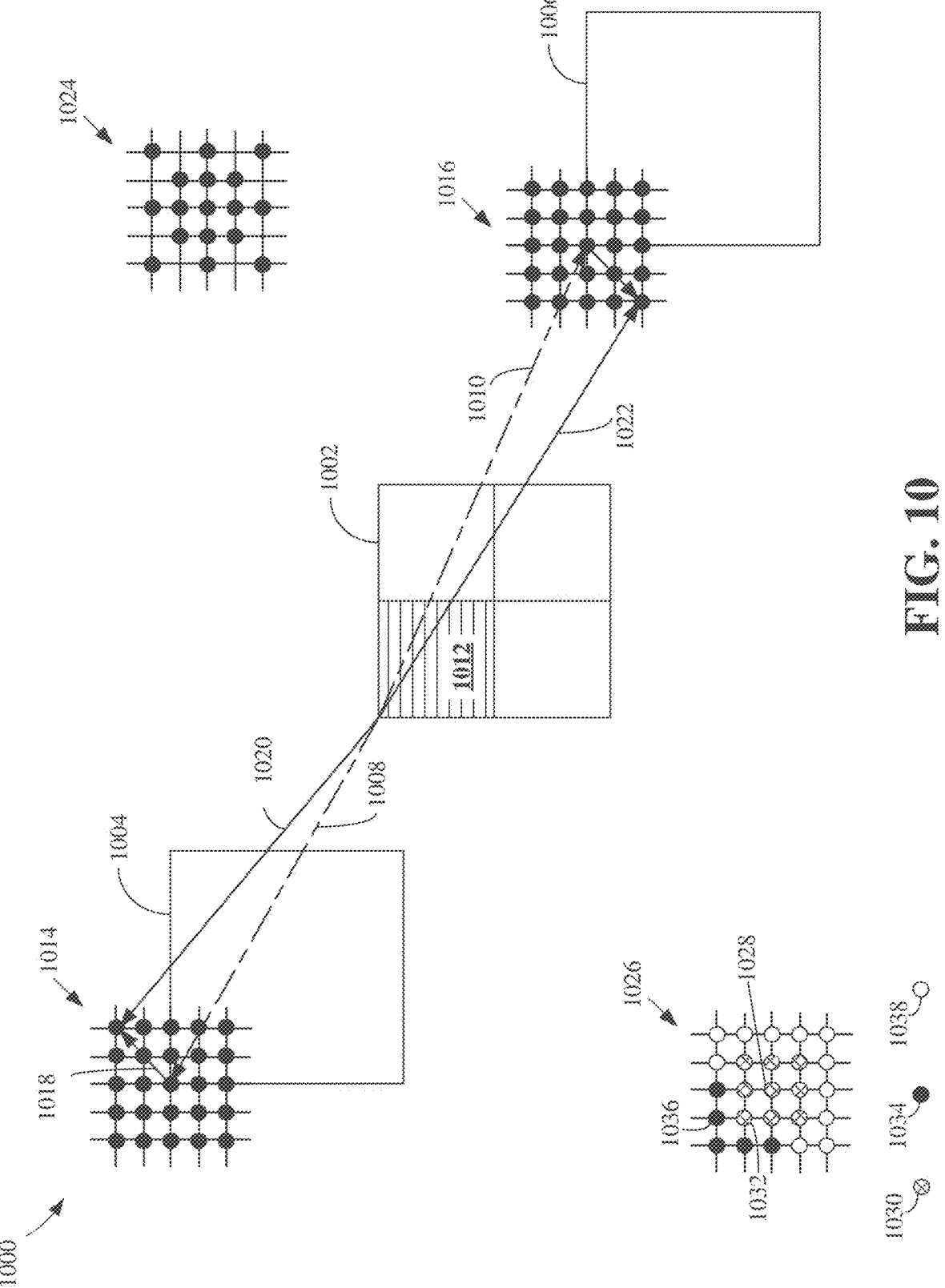
FIG. 10 is an illustration of identifying optimal motion vectors for a sub-block of a current block.

The technique 900 is further described with reference to FIG. 10. FIG. 10 is an illustration 1000 of identifying optimal motion vectors for a sub-block of a current block. The illustration 1000 includes a current block 1002 of a current frame (not shown). The current block 1002 can be the current block 804 of FIG. 8. The current block 1002 is illustrated as being predicted using a compound inter-prediction mode. As such, a first reference block 1004 can be the first prediction block 816 of FIG. 8; a second reference block 1006 can be the second prediction block 812 of FIG. 8; an initial MV 1008 can be the first MV 806 of FIG. 8; and an initial MV 1010 can be the second MV 810 of FIG. 8.

At 902, the current block is divided into sub-blocks. The current block 1002 of FIG. 10 is shown as being divided into four non-overlapping sub-blocks, which include a sub-block 1012. In an example, the current block can be divided into k (where k is a positive integer) number of non-overlapping sub-blocks. In an example, the size of each sub-block can be a predefined size that is known to (i.e., is a configuration of) the encoder and the decoder. The predefined size can be 16×16, 8×8, 4×4, or some other predefined size. In an example, the sub-block size can be derived from the size of the current block. To illustrate, k can be four (4) regardless of the size of the current block. As such, if the current block has a size of 32×32 pixels, then the sub-block size can be 16×16; and if the block size is 64×64 pixels, the sub-block size can be 32×32. In an example, the sub-block size can be the same as that of the current block. That is, the current block is divided into only one sub-block that is co-extensive with the current block itself. Said another way, the current block itself is used as the only sub-block.

In an example, the sub-block size can be derived from the compound prediction mode of the current block. To illustrate, if the compound prediction mode derives the initial motion vectors $MV_0$ and $MV_1$ from spatially or temporally neighboring blocks of the current block, then motion within the current block can be assumed to generally be consistent with that of the neighboring blocks. An example of such a compound mode is the NEAR_NEARMV mode of the codec AV1. In such cases, a larger sub-block size may improve the compression gain because of the consistent motion. On the other hand, motion of compound modes that are signaled with one or more MVDs indicate that motion within the current block is less correlated with motion in the reference blocks. As such, smaller sub-block size may produce better prediction. An example of such a compound mode is the NEW_MV mode of the codec AV1.

In yet another example, the sub-block size can be signaled in a bitstream, such as the compressed bitstream 420 of FIGS. 4 and 5. The sub-block size can be signaled can be signaled in a sequence header, a frame header (i.e., the header of the current frame that includes the current block), a slice header, or a block header of the current block. The size of each sub-block is denoted W×H, where W denotes the width in pixels and H denotes the height in pixels.

At 904, the technique 900 determines whether there are more sub-blocks for which refined motion vectors are to be obtained. If there are no more sub-blocks, then the technique 900 terminates. If there are more sub-blocks, then the technique 900 proceeds to 906 to identify an optimal $RefinedMV_0$ and an optimal $RefinedMV_1$ for a next sub-block. The optimal $RefinedMV_0$ and the optimal RefinedMV$_1$ are obtained by first obtaining respective optimal MV offsets (i.e., $\Delta MV_0$ and $\Delta MV_1$).

In an example, and to reduce computational complexity, one optimal MV offset (denoted $\Delta MV$) is used to obtain the optimal RefinedMV$_0$ and an optimal RefinedMV$_1$. The optimal RefinedMV$_0$ and an optimal RefinedMV$_1$ are then obtained using equation (1A), where $d_0$ and $d_1$ are as described with respect to FIG. 8:

$$\begin{cases} RefinedMV_{0,x} = MV_{0,x} + \Delta MV_x \\ RefinedMV_{0,y} = MV_{0,y} + \Delta MV_y \\ RefinedMV_{1,x} = MV_{1,x} - \Delta MV_x \times \dfrac{d_1}{d_0} \\ RefinedMV_{1,y} = MV_{1,y} - \Delta MV_y \times \dfrac{d_1}{d_0} \end{cases} \quad (1A)$$

In another example, one optimal MV offset (denoted $\Delta MV$) is used to obtain the optimal RefinedMV$_0$ and an optimal RefinedMV$_1$ according to equations (1B).

$$\begin{cases} RefinedMV_{0,x} = MV_{0,x} + \Delta MV_x \\ RefinedMV_{0,y} = MV_{0,y} + \Delta MV_y \\ RefinedMV_{1,x} = MV_{1,x} - \Delta MV_x \\ RefinedMV_{1,y} = MV_{1,y} - \Delta MV_y \end{cases} \quad (1B)$$

In an example, identifying, at 906, the optimal RefinedMV$_0$ and the optimal RefinedMV$_1$ for the next sub-block includes the steps 906_2 to 906_14. In steps 906_2 to 906_14, the technique 900 iterates, in each of the horizontal and the vertical directions, over all possible MV offsets in a search area to identify an optimal MV offset.

An optimal MV offset ($\Delta MV$) for a sub-block can be found (e.g., identified) by searching neighboring areas of MV$_0$ and MV$_1$. The technique 900 searches a predefined (2n+1)×(2n+1) area around the initial motion vectors and selects the optimal MV offset ($\Delta MV$) as the MV offset that produces a best match between a first predictor P$_0$ and a second predictor P$_1$. In an example, the best match can be identified using sum of absolute difference (SAD) values. Other measures of differences between the predictors can be used to select the optimal MV offset. In an example, only offset motion vectors corresponding to integer pixel positions within the search area (2n+1)×(2n+1) are considered. In another example, the search can also include motion vectors at sub-pixel positions. The sub-pixel positions can be at ½, ¼, ⅛, 1/16, or some other sub-pixel precision. In an example, n can be 2. As such, the search area includes (2×2+1)×(2×2+1)=25 integer positions.

For each of the offset MVs within the search area, a similarity metric between the corresponding first predictor P$_0$ and second predictor P$_1$ is determined. In an example, and as mentioned, the sum of absolute values (SAD) can be used as the similarity metric. However, other similarity metrics are possible, such as a mean square error, a Hadamard-transform based SAD, or some other suitable similarity metric. The SAD between a first predictor P$_0$ and a second predictor P$_1$ can be calculated using equation (2) below. In equation (2), W and H are, respectively, the width and the height of the sub-block.

$$SAD = \sum_{i=0}^{W-1} \sum_{j=0}^{H-1} \left| P_0(i, j) - P_1(i, j) \right| \quad (2)$$

FIG. 10 illustrates a search area 1014 in the first reference frame and a search area 1016 in the second reference frame. For brevity, only the search area 1014 is further described because a similar description applies with respect to the search area 1016. The search area 1014 illustrates integer pixel locations in a (2n+1)(2n+1) search area, where n=2. In an example, the technique 900 can iterate over the 25 integer pixel locations. In another example, the technique 900 can additionally iterate over sub-pixel locations in increments according to a specified precision, such as ⅛ or some other sub-pixel precision.

The search area 1014 is centered at the end point of the initial MV 1008. At 906_2, the technique 900 determines whether there are additional horizontal offsets to search (e.g., test, visit, etc.). If there are, then the technique 900 proceeds to 906_4; otherwise the technique 900 proceeds to 906_14. Step 906_2 may be or may implement an outer loop, which may be represented in pseudo-code as "for $\Delta MVx$=−n to +n" and the step 906_4 may be or may implement an inner loop, which may be represented in pseudo-code as "for $\Delta MVy$=−n to +n."

At 906_6, refined motion vectors RefinedMV$_0$ and RefinedMV$_1$ are computed, such as using equation (1A) or (1B). At 906_8, a first prediction block P$_0$ is obtained from or using RefinedMV$_0$. At 906_10, a second prediction block P$_1$ is obtained from or using RefinedMV$_1$. At 906_12, a similarity metric between the first prediction block P$_0$ and second prediction block P$_1$ is computed. In an example, the similarity metric can be the SAD between the first prediction block P$_0$ and second prediction block P$_1$. From 906_12, the technique 900 may proceed back to 906_4 to move to the next vertical offset in the search area. If there are no more vertical offsets to test for a current horizontal offset selected at 906_2, then the technique 900 proceeds from 906_4 to 906_2 to select the next horizontal offset (if any).

At 906_14, an optimal RefinedMV$_0$ and an optimal RefinedMV$_1$ corresponding to the best similarity (i.e., the most similar blocks) are identified. In an example, the best similarity can correspond to the minimal SAD. Referring again to FIG. 10, the illustration 1000 shows that an optimal offset 1018 (i.e., optimal $\Delta MV$) is identified therewith resulting in a first refined MV 1020 and a second refined MV 1022.

In an example, and to reduce computational complexity, only a subset of the search points of a search area are considered. That is, only a subset of the (2n+1)×(2n+1) integer locations are searched (e.g., considered). In an example, the subset can be as shown with respect to a search area 1024 of FIG. 10. As such, the search area can include the integer pixel locations at (−2, −2), (−2, 0), (−2, 2), (−1, −1), (−1, 0), (−1, 1), (0, −2), (0, −1), (0, 0), (0, 1), (0, 2), (1, −1), (1, 0), (1, 1), (2, −2), (2, 0), and (2, 2), where (0, 0) is the end point of the motion vector (i.e., the integer pixel or closest integer pixel that the initial MV 1008 points to).

In yet another example of reducing complexity, a multi-step (e.g., a two-step) search can be performed, as illustrated with respect to search area 1026 of FIG. 10. To illustrate, in a first step, an (n+1)×(n+1) search area around the center (0, 0) is searched for an intermediate optimal MV offset. In a next step, the center pixel location corresponding to the intermediate optimal MV offset is set, and a search is performed again for the optimal MV offset in an (n+1)×(n+1) search window. To illustrate, the origin is set initially to at a pixel location 1028 and the points in a 3×3 window (i.e., n=1) are searched for the intermediate optimal MV offset. As such, all points filled with a pattern 1030 are searched. FIG. 10 illustrates that the intermediate optimal MV offset corresponds to a location 1032. Thus, the center is now moved to the location 1032 and a 3×3 window around the new center is now searched. Thus, the pixel locations filled with a pattern 1034 are now additionally searched. FIG. 10 illustrates that the optimal MV offset corresponds to a location 1036. Locations filled with a pattern 1038 (e.g., empty circles) are not searched. A two-step search process is further illustrated with respect to the pseudo-code of Table I.

TABLE I

Identify initial MV

Figure 11:
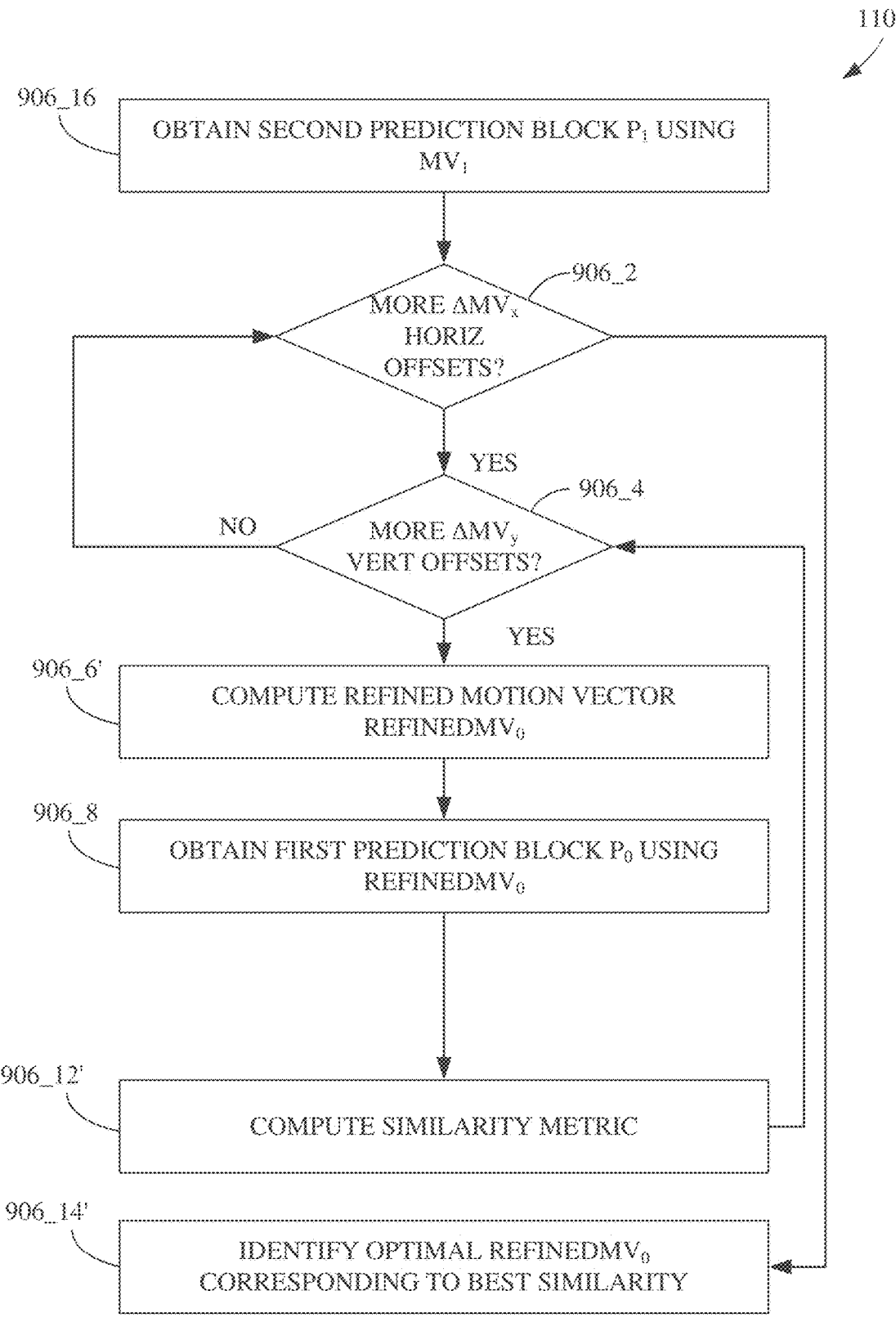
FIG. 11 is an example of a technique for identifying an optimal offset MV for only one of two reference frames.

Step 1
  Set center to (0, 0)
  Search 3×3 window for intermediate optimal MV offset
  Select the point in the 3×3 window corresponding to minimal SAD
Step 2
  Set MV = initial MV + intermediate optimal MV offset
  Set center to the point selected in Step 1
  Search 3×3 window for optimal MV offset
  Select the point in the 3×3 window corresponding to minimal SAD
  Set RefinedMV = MV + optimal MV offset In another example of complexity reduction, an optimal offset MV can be computed for only one of the reference frames. The MV of the other reference frame can remain unchanged. FIG. 11 is an example of a technique 1100 for identifying an optimal offset MV for only one of the (e.g., two) reference frames. The steps described with respect to the technique 1100 can be used in place of the steps 906_2 to 906_14 of FIG. 9. The technique 1100 includes many of the same steps as 906_2 to 906_14, and only differences therefrom are described.

FIG. 11 illustrates that $MV_1$ is kept unchanged, and an optimal offset is derived only for $MV_0$. The technique 1100 does not include the step 906_10. Instead, the technique 1100 includes a step 906_16 for obtaining a second prediction block $P_1$ using $MV_1$ outside the outer loop of step 906_2 and the inner loop of step 906_4. That is, the first prediction block $P_1$ is calculated once. At 906_6', a refined motion vector RefinedMV$_0$ is calculated. At 906_12', a similarity metric is computed between the second prediction block $P_1$ obtained at 906_16 and the first prediction block $P_0$ obtained at 906_8. At 906_14', an optimal RefinedMV$_0$ corresponding to the best similarity is identified. When the technique 1100 is used for the step 906 of FIG. 9, the final prediction for next subblock is generated, at 908, using the optimal RefinedMV$_0$ and $MV_1$. As can be appreciated, any of the search techniques (e.g., searching at sub-pixel locations, two-step search process, sub-set of integer locations, or a combination thereof) can be used in conjunction with the identifying an optimal offset MV for only one of the reference frames.

To further describe some implementations in greater detail, reference is next made to examples of techniques which may be performed for sub-block based motion vector refinement. FIG. 12 is an example of a flowchart of a technique 1200 for coding a current block. The technique 1200 can be executed using computing devices, such as the systems, hardware, software, and techniques described above. The technique 1200 can be implemented, at least in part, using any of the hardware arrangements described below.

The technique 1200 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the technique 1200. The technique 1200 may be implemented in whole or in part in the intra/inter prediction stage 508 of the decoder 500 of FIG. 5. The technique 1200 can be implemented using specialized hardware or firmware. Multiple processors, memories, or both, may be used.

While not specifically shown in FIG. 12, the technique 1200 may code or infer that the current block is coded using a compound inter-prediction mode. As such, the current block is associated with more than one MVs.

At 1202, a first initial motion vector and a first reference frame are obtained for the current block. Obtaining the first initial motion vector and the first reference frame can include decoding from a compressed bitstream, such as the compressed bitstream 420 of FIG. 5, one or more syntax elements that can be or can be used to obtain (e.g., select, infer, etc.) the first initial motion vector and the first reference frame.

At 1204, a second initial motion vector and a second reference frame are obtained for the current block, which can be similar to obtaining the first initial motion vector and the first reference frame at 1202. At 1206, an optimal motion vector refinement (ΔMV) is identified for a sub-block of the current block. The optimal motion vector refinement can be identified above, such as described with respect to FIG. 9, FIG. 10, or FIG. 11 using any of the hardware described below. This refinement value can also be referred to as an offset motion vector.

At 1208, a first refined motion vector is obtained as a combination of the first initial motion vector and the offset motion vector. The first refined motion vector can be obtained using RefinedMV$_{0,x}$=MV$_{0,x}$+ΔMV$_x$ and RefinedMV$_{0,y}$=MV$_{0,y}$+ΔMV$_y$. In an example, the technique 1200 can further include obtaining a second refined motion vector as a combination of the second initial motion vector and the offset motion vector. The second refined motion vector can be obtained using RefinedMV$_{1,x}$=MV$_{1,x}$−ΔMV$_x$ and RefinedMV$_{1,y}$=MV$_{1,y}$−ΔMV$_y$, which are as described above with regards to equation (1B).

At 1210, a first prediction block is obtained based on the first refined motion vector. At 1212, a prediction block is obtained for the sub-block by combining the first prediction block and a second prediction block obtained using the second initial motion vector. In an example, the second prediction block can be a prediction block obtained using the second initial motion vector, such as described with respect to 906_16 of FIG. 9. In another example, the second prediction block can be obtained as described with respect to 906_10 of FIG. 9.

In an example, a flag (e.g., dmvd_enable_flag) may be signaled in (i.e., encoded in and decoded from) the compressed bitstream to indicate whether sub-block based motion vector refinement is to be performed for the current block. As such, if the flag is enabled (e.g., is equal to 1), then the technique 1200 is performed. The flag can be included in a sequence header, a frame header (i.e., the header of the current frame that includes the current block), a slice header, or a block header of the current block. In an example, a block-level flag (i.e., dmvd_enable_flag) can be signaled to indicate whether sub-block based motion vector refinement is used for that block or not.

As signaling a block-level flag can introduce overhead bits and impact compression performance, the flag can be signaled conditionally to reduce the overhead. In an example, whether the dmvd_enable_flag is coded in the bitstream can be based on the compound inter prediction mode. In an example, the compound inter-prediction modes supported by a codec can be categorized into separate categories and whether the flag is encoded or inferred can depend on the category of the compound inter-prediction mode of the current block. In an example, the compound inter-prediction mode can be categorized into 1 of 3 categories (i.e., Categories 0, 1, and 2). Category 0 can be characterized by or include compound inter-prediction modes that do not use optical flow motion refinement techniques. Category 1 can be characterized by or include compound inter-prediction modes that do not signal MVDs; instead, the modes of category 1 are such that the initial motion vectors $MV_0$ and $MV_1$ are derived from one or more lists of candidate MVs. Category 2 can be characterized by or include compound inter-prediction modes that do not belong to either category 0 or category 1.

Whether the dmvd_enable_flag is signaled (i.e., is included in the bitstream) can be based on the category of the compound inter-prediction mode. In an example, if the compound inter-prediction mode of the current block belongs to category 0, then the dmvd_enable_flag can be always equal to 0 and is not signaled in the bitstream; if the compound inter-prediction mode of the current block belongs to category 1, then the dmvd_enable_flag is always equal to 1 and is not signaled in the bitstream; and if the compound inter-prediction mode of the current block belongs to category 3, the dmvd_enable_flag can be signaled to the compressed bitstream to indicate whether sub-block based motion vector refinement is to be performed for the current block.

In another example, the dmvd_enable_flag may be signaled based on the size of the current block. For example, if the size of the block is larger than a predefined threshold size, then the flag is signaled; otherwise, the flag is not signaled and is set to 0, indicating that sub-block based motion vector refinement is not to be performed for the current block. For example, if minimum(W, H)>16, then the flag dmvd_enable_flag is signaled, where W and H are the width and height of the current block, respectively.

In another example, the dmvd_enable_flag may be signaled based on the distances $d_0$ and $d_1$. For example, if at least one of the distance $d_0$ (between the current frame and the first reference frame) or the distance $d_1$ (between the current frame and the second reference frame) is greater than a threshold distance (e.g., 8 frames in display order), then the dmvd_enable_flag is signaled. If the dmvd_enable_flag is not signaled, then the value of the dmvd_enable_flag can be considered equal to 0.

In an example, the dmvd_enable_flag can be entropy coded using a context that may be derived based the size of the current block and the compound inter-prediction mode. Additional or different contexts are possible.

In an example, another syntax element (refine_mode) can be coded in the compressed bitstream instead of the dmvd_enable_flag. The refine_mode syntax element can indicate the specific way that sub-block based MV refinement is to be applied. In an example, the refine_mode can have one of the values 0, 1, 2, 3. A value of 0 can indicate that sub-block based MV refinement is not to be applied. A value of 1 can indicate that both of the initial motion vectors $MV_0$ and $MV_1$ are to be refined. A value of 2 can indicate that only $MV_0$ is to be refined but that $MV_1$ is to be unchanged (i.e., is not refined). A value of 3 can indicate that only $MV_1$ is to be refined but that $MV_0$ is to be unchanged (i.e., is not refined).

The techniques described above can be difficult to implement in hardware decoders. For example, a 1-step search performs a full search of a 5×5 space with 25 SAD operations on all positions (e.g., all offsets from the center of the prediction block) and then selects the minimum value from the 25 results. A 2-step search involves searching the 5×5 space in two parts. The first part searches the 3×3 positions around the center point, and the second part searches the 3×3 positions about the center point from the minimum result from the first part.

Specialized hardware arrangements are next described for implementing motion vector refinement as part of a hardware decoder. Specifically, each hardware arrangement may be used to obtain the offset MVs, determine the optimal offset MV, and compute the refined MVs. In some embodiments, the hardware may be arranged in a pipeline to allow a throughput of one block (i.e., sub-block) during each clock count. For example, the hardware arrangement can contain enough components to obtain all required offset MVs simultaneously using a separate hardware component for each one. In an alternative example, the hardware arrangement contains two sets of components configured to obtain a first set of the offset MVs at a clock count and a second set of the offset MVs at a later clock count. In both examples, the hardware components are used only once for each block, allowing for a throughput of one block per clock count.

In other embodiments, the hardware may be arranged such that components are used multiple times while processing the same block. For example, the hardware arrangement may only obtain a subset of the required offset MVs at a time, and cycles through the hardware components until all required offset MVs are obtained. As a result, the hardware arrangement has a throughput that requires more than one clock count (e.g., 4, 13, or 14 clock counts) before all outputs to produce a block are available. Such a hardware arrangement may include fewer components and still produce block information quick enough for some applications.

Thus, depending on the application, different embodiments may be preferred. Using a separate hardware component for each offset MV to support a throughput of one block each clock count is fast but inefficient. However, the hardware footprint to implement the decoder is increased. Using the same components multiple times to produce the set of offset MVs is slower but more efficient. Therefore, depending on implementation requirements, different embodiments may be preferrable. For example, in some implementations, a throughput of one block in 16 clock counts or less is sufficient. Thus, a hardware arrangement that uses the same components multiple times may be preferrable.

The hardware components of the hardware arrangements described hereinbelow may comprise one or more application-specific integrated circuits (ASICs) or other hardware components in combination that implement the functions described below. In the examples described herein, a clock count is based on a clock rate of 1.2 Ghz, but other clock rates are possible as a measure of throughput.

Figure 13A:
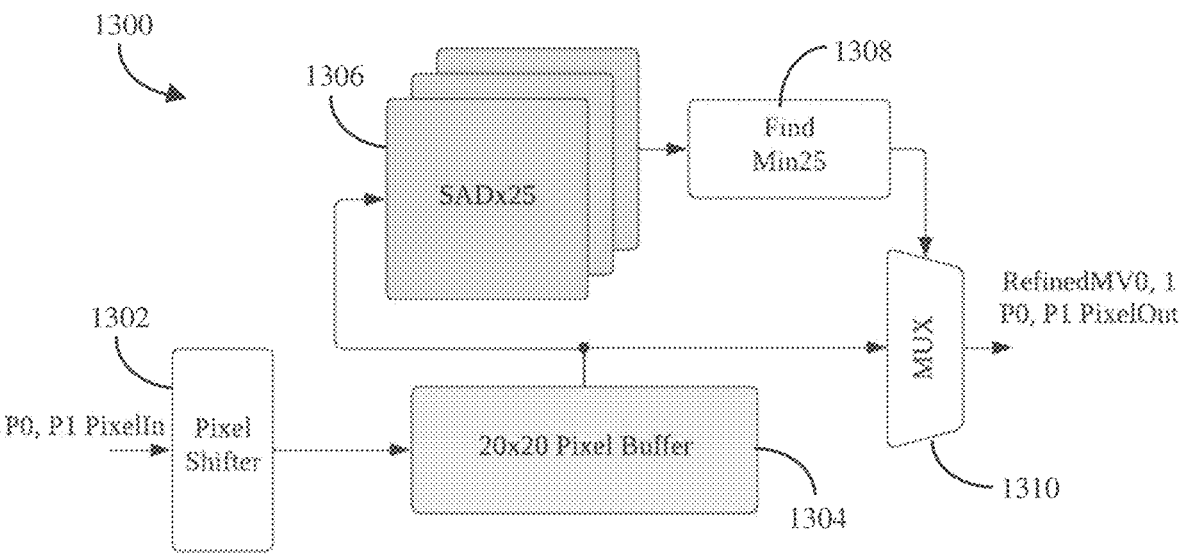
FIG. 13A is a schematic of a first embodiment of hardware architecture used for decoder-side motion vector refinement.

Referring to FIG. 13A, a schematic of a first embodiment of a hardware arrangement or architecture 1300 used for DMVR is shown. The hardware architecture 1300 may be used to implement a portion of the technique 1200 shown in FIG. 12. For example, the hardware architecture 1300 is configured to perform steps 1206, 1208, and 1210 of the technique 1200. At 1206, as described above, an offset motion vector is identified for a sub-block of the current block. Then, the offset motion vector is used to refine the initial motion vectors to refine a prediction block for a sub-block of the current block, thus improving the appearance of the current block once reconstructed.

The hardware architecture 1300 includes a pixel shifter 1302. The pixel shifter 1302 receives, as inputs to the hardware architecture 1300, the first reference frame and the second reference frame used for inter prediction of the current block along with the first initial motion vector and the second initial motion vector used for inter prediction of the current block. The pixel shifter 1302 may use the first initial motion vector to identify pixels of the first prediction block within the first reference frame, along with pixels defined by a first search area for the first prediction block. Similarly, the pixel shifter 1302 may use the second initial motion vector to identify pixels of the second prediction block, along with pixels defined by a second search area for the second prediction block.

The pixel shifter 1302 provides this output to the pixel buffer 1304, which is used to store data for the hardware architecture 1300. The pixel buffer 1304 stores pixel values of pixels of the first prediction block and pixels defined by a first search area of the first prediction block and stores the second prediction block and pixels defined by a second search area for the second prediction block. The pixels defined by the first search area comprise pixels about the periphery of the first prediction block, and the pixels defined by the second search area comprise pixels about the periphery of the second prediction block.

In an example where the first search area and the second search area are each 5×5 pixels, two rows of pixels may extend from each of the top row and the bottom row of each prediction block, and two columns of pixels may extend from each of the left column and the right column of each prediction block to accommodate the different offset MVs of the search areas. The pixel buffer 1304 may be of any size to accommodate these pixel values with the prediction blocks. In this example, the sub-block to be predicted, and hence the prediction blocks, are each 16×16 pixel blocks. Accordingly, the pixel buffer 1304 may comprise two 20×20 pixel buffers. Other size pixel buffers may be used.

The hardware architecture 1300 includes a number of hardware components that, for multiple pixel locations of the first search area and the second search area defined by respective offset motion vectors (MVs), determine a respective difference value between the first prediction block and the second prediction block shifted by the respective offset MVs. The difference value is related to the similarity metric described previously, as the difference value indicates how similar the shifted first and second prediction blocks are to each other. A lower difference value indicates a higher similarity between the prediction blocks.

In this example, the hardware components to perform this calculation are sum of absolute difference (SAD) components 1306. The SAD components 1306 finds the sum of absolute differences between the shifted first and second prediction blocks as illustrated in FIG. 10. Alternatively, the SAD components 1306 may be another type of component used to find another a difference value (a similarity metric, etc.) between the corresponding first prediction blocks and second prediction blocks at the offset positions. In the hardware architecture 1300, 25 SAD components 1306 are provided to search the 25 integer pixel locations identified by the initial motion vectors $MV_0$ and $MV_1$ (i.e., each SAD component 1306 is responsible for one integer pixel location).

The hardware architecture 1300 also include a hardware component that determines a minimum of the respective difference values, where a location of the minimum is associated with an offset MV of the respective offset MVs. In this example, a FindMin component 1308 may be used to identify the lowest difference value (the minimum) from among the difference values, in this example the minimum SAD output from the 25 SAD components 1306. More specifically, the FindMin component 1308 receives the 25 SADs from the 25 SAD components 1306 to determine a minimum SAD from the 25 SADs. For this reason, the FindMin component 1308 is labeled FindMin25. Alternatively, in embodiments with another number of SAD components 1306, the FindMin component 1308 may find the minimum SAD from a different number of SADs. The integer pixel location corresponding to the minimum represents the offset motion vector (as compared to the original center pixel of a prediction block) that can be used to calculate the first refined MV and the second refined MV.

The FindMin component 1308 may also perform the function of determining (calculating, obtaining, etc.) the first refined MV and the second refined MV for reconstruction of the sub-block of the current block. The first refined MV is determined by modifying the first initial MV using the offset MV, and the second refined MV is determined by modifying the second initial MV using the offset MV as described previously. The first initial MV and the second initial MV may be provided as pass through information from the pixel shifter 1302 to the pixel buffer 1304, to the SAD components 1306, and to the FindMin component 1308.

The FindMin component 1308 provides its output to the output hardware component, in this case a multiplexer (MUX) 1310. In this example, the output is the first refined MV and the second refined MV.

Alternatively, the FindMin component may provide the offset MV to the output hardware component, here the MUX 1320, to determine the first refined MV and the second refined MV by modifying each of the first initial MV and the second initial MV using the offset MV. The first initial MV and the second initial MV may be provided as pass through information from the pixel shifter 1302 to the pixel buffer 1304, and to the MUX 1310.

In either situation, the MUX 1310 may also determine a refined first prediction block centered at a position within the first reference frame identified by the first refined MV, and a refined second prediction block centered at a position within the second reference frame identified by the second refined MV. In each case, the pixels of the initial prediction blocks may be provided by the pixel buffer 1304 for the MUX 1310 to select the pixel values for the refined prediction blocks. The MUX 1310 may output the first refined motion vector $RefinedMV_0$, the second refined motion vector $RefinedMV_1$, the (refined) first prediction block $P_0$, and the (refined) second prediction block $P_1$.

Figure 13B:
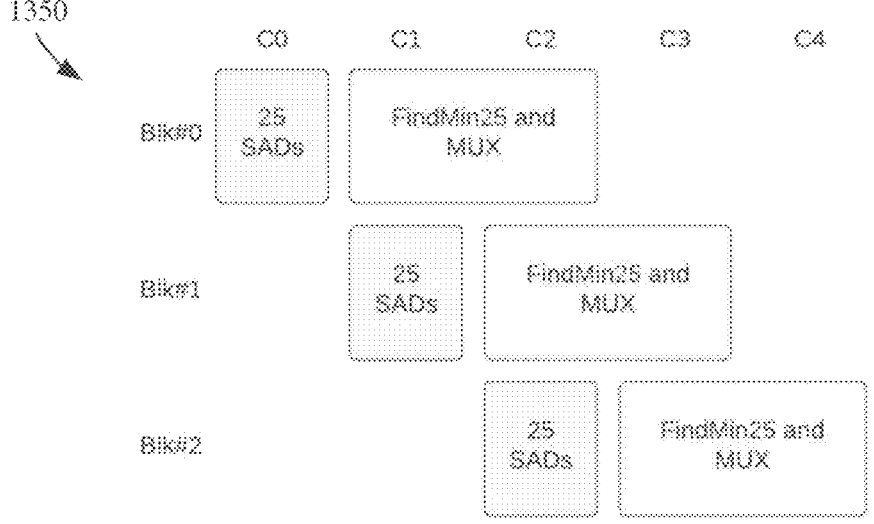
FIG. 13B is a timing diagram identifying the hardware components of FIG. 13A active during each clock count.

FIG. 13B is a timing diagram 1350 identifying the hardware components of FIG. 13A active during each clock count. For example, C0 represents a first clock count, C1 represents a second clock count, and C2 represents a third clock count. As shown in FIG. 13B, the 25 SAD components 1306 may produce their output for a first block Blk #0 during the first clock count, the FindMin component 1308 may produce its output and the MUX 1310 may produce its output during during the second and third clock counts.

The operations shown by the clock counts in FIG. 13B may occur for multiple blocks (i.e., sub-blocks) sequentially. For example, the SAD components 1306 may find the SADs for a first block Blk #0 during C0. Then, during C1, the FindMin component 1308 and MUX 1310 begin to process the SADs for the first block Blk #0, and the SAD components 1306 find the SADs for a second block Blk #1, during C2, the FindMin component 1308 and MUX 1310 begin to process the SADs for the second block Blk #1, and the SAD components 1306 find the SADs for a third block Blk #2, and so on. That is, once processing by the SAD components 1306 is complete for one block, processing of the next block can start. As a result, after enough clock counts have passed to allow the first block to pass through the hardware architecture 1300 (at C2), the hardware architecture 1300 can produce the output for one block (e.g., a sub-block) every clock count. For example, processing for the second block is completed at C3, and processing for the third block is completed at C4.

The following embodiments of hardware architecture contain some of the same components as the hardware architecture 1300. As such, the same components will use the same reference number as in FIG. 13A, and a description of the component will be omitted unless otherwise needed for clarity. The following embodiments of hardware architecture contain some similar or different components from those components in the hardware architecture 1300. As a result, a description of the component may include comparison or reference to the description above.

Figure 14A:
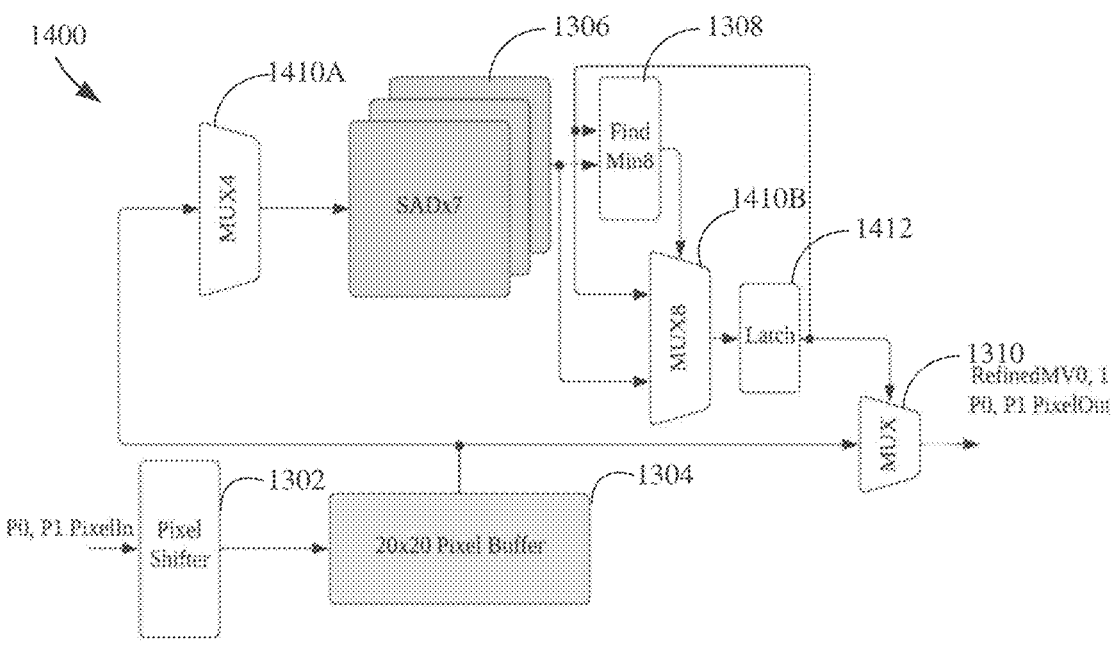
FIG. 14A is a schematic of a second embodiment of hardware architecture used for decoder-side motion vector refinement.

Referring to FIG. 14A, a schematic of a second embodiment of hardware arrangement or architecture 1400 used for DMVR is shown. Like the hardware architecture 1300, the hardware architecture 1400 may be used to implement the same portion of the technique 1200 as described in FIG. 13A. The hardware architecture 1400 may be used to perform the 1-step motion vector refinement as described above.

The hardware architecture 1400 incorporates the pixel shifter 1302, the pixel buffer 1304, SAD components 1306, and a FindMin component 1308. In the hardware architecture 1400, there are 7 SAD components 1306. The 7 SAD components 1306 may search the 25 integer pixel locations using multiple clock counts by reusing the SAD components 1306 as described in further detail below. For example, the 7 SAD components may search 7 of the 25 integer pixel locations to obtain a first set of 7 SAD values, then 7 more integer pixel locations to obtain a second set of 7 SAD values, followed by 7 more integer pixel locations to obtain a third set of 7 SAD values, and finishing with the remaining 4 integer pixel locations to obtain a fourth set of SAD values.

The hardware architecture 1400 contains two multiplexers in addition to the MUX 1310. The MUX 1410A is configured to select SAD component 1306 to which to assign each of the respective shifted reference blocks for determination of the SAD values. The MUX 1410 is labeled MUX4 in recognition that each of the SAD components 1306 can have up to 4 inputs. In other words, the MUX 1410 sequences the inputs to the SAD components 1306 from the pixel buffer 1304.

In the hardware architecture 1400, the FindMin component 1308 is configured to determine the minimum SAD from a set of up to 8 SAD values and is configured to operate multiple times over multiple clock counts. The FindMin component 1308 is labeled FindMin8 to reflect that it has up to 8 input values. In sequence, the FindMin component 1308 finds the minimum SAD from the first set of 7 SAD values, which may be referred to as an intermediate minimum herein. Then, FindMin component 1308 finds the minimum SAD between the second set of 7 SAD values and the minimum SAD from the first set of SADs (i.e., a first intermediate minimum). The FindMin component 1408 continues to compare the next set of SAD values with the intermediate minimum from the previous sets of SAD values until the minimum of all 25 SADs is determined.

The hardware architecture 1400 can do this using the MUX 1410B and the latch 1412. The output of the FindMin component 1308 (e.g., the intermediate minimum offset) is output to the MUX 1410B, and the MUX 1410B receives the initial first and second MVs to produce refined first and second MVs associated with the intermediate minimum offset, the refined first and second prediction blocks, or some combination thereof. In any event, the data associated with an intermediate minimum of the current set of SAD values may be stored by the latch component 1404 such that the FindMin component 1308 may use the minimum SAD from the current set of SADs when finding the minimum SAD between the next set of SAD values and the minimum SAD from the current set of SAD values. As a result, the latch component 1404 can output the optimal values through the MUX 1310 as described previously.

Figure 14B:
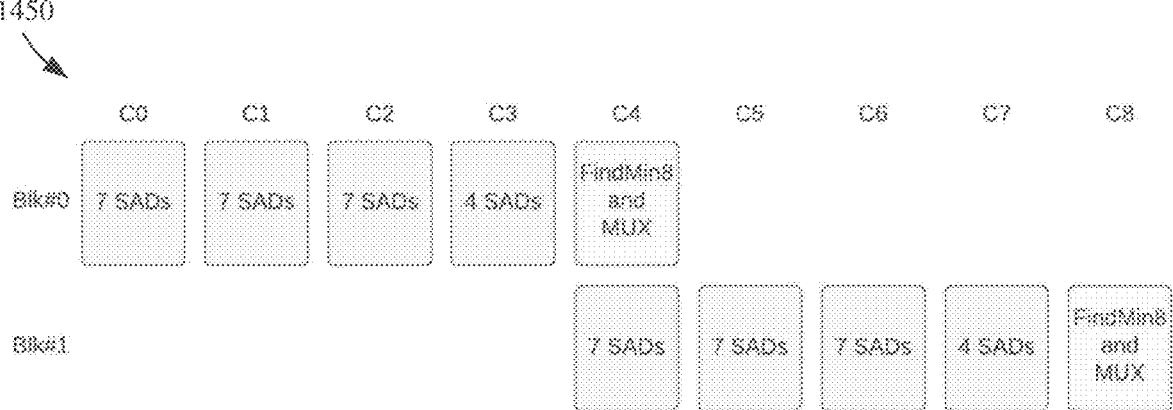
FIG. 14B is a timing diagram identifying the hardware components of FIG. 14A active during each clock count.

FIG. 14B is a timing diagram 1450 identifying the hardware components of FIG. 14A active during each clock count. As shown in FIG. 14B, the hardware architecture 1400 may use the first through fourth clock counts (C0-C3) to find the SAD values from the 25 integer pixel locations (i.e., 7 pixel locations during the first clock count, 7 more during the second clock count, 7 more during the third clock count, and the remaining 4 during the fourth clock count). Then, the FindMin component 1308 and the MUX 1410B generate the final output during a fifth clock count (C4).

Because components of the hardware architecture 1400 are used multiple times for processing the current block, limited operations can occur concurrently during sequential processing of blocks. For example, the next block may not begin processing using the hardware architecture 1400 until the fifth clock count, where the SAD operations are complete. As a result, after enough clock counts have passed to allow a first block to pass through the hardware architecture 1400 (e.g., output at the fifth count), the hardware architecture 1400 can generate outputs to produce one block every four clock counts. As seen in FIG. 14B, for example, a first block BLK #0 is processed through the SAD components 1306 through the fourth clock count. At the fifth block count, the SAD components 1306 are available for processing a second block BLK #1 while processing ends for the first block BLK #0 during the fifth clock count, and so on.

Figure 15A:
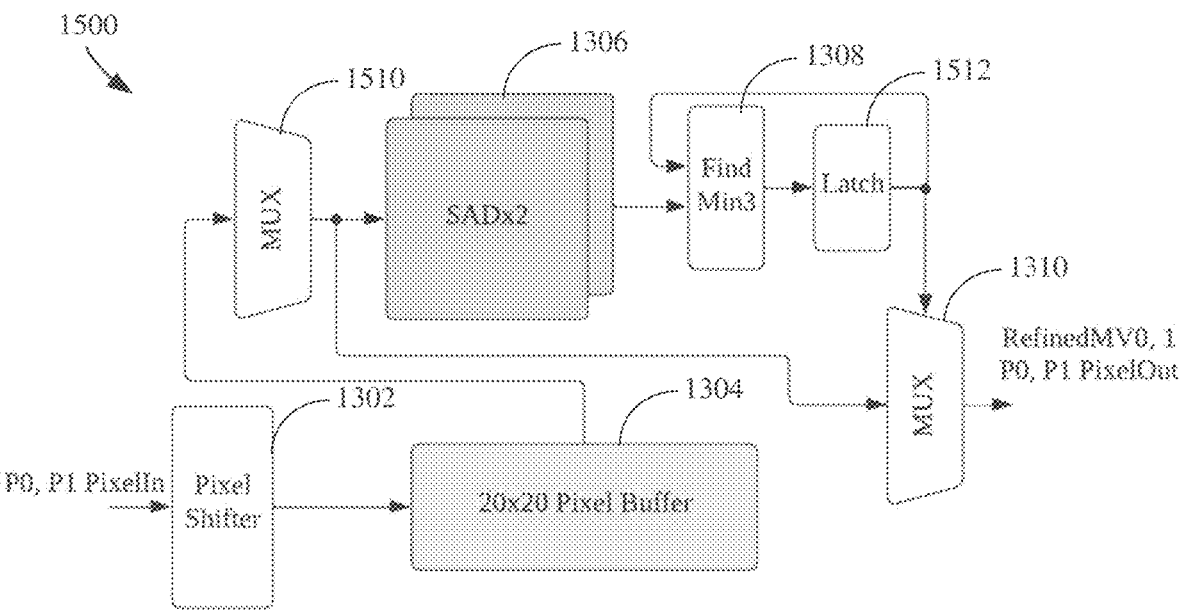
FIG. 15A is a schematic of a third embodiment of hardware architecture used for decoder-side motion vector refinement.

Referring to FIG. 15A, a schematic of a third embodiment of hardware arrangement or architecture 1500 used for DMVR is shown. Like the hardware architecture 1300, the hardware architecture 1500 may be used to implement the same portion of the technique 1200 as described in FIG. 13A. The hardware architecture 1500 may be used to perform the 1-step motion vector refinement as described above.

The hardware architecture 1500 contains the pixel shifter 1302, the pixel buffer 1304, SAD components 1306, a FindMin component 1308, and a MUX 1310. In the hardware architecture 1500, there are 2 SAD components 1306. The 2 SAD components 1306 may search the 25 integer pixel locations using multiple clock counts. For example, the 2 SAD components may search 2 of the 25 integer pixel locations to obtain a first set of SAD values, 2 more integer pixel locations to obtain a second set of SAD values, and so on, until the remaining 1 integer pixel location is used to obtain a SAD value.

The MUX 1510, like the MUX 1310, assigns respective prediction blocks to a SAD component of the components 1306. The FindMin component 1308 is labeled FindMin3 because it is configured to determine the minimum SAD from a set of up to 3 SAD values, and the FindMin component 1308 is configured to operate multiple times over multiple clock counts. For example, the FindMin component 1308 may find the minimum SAD from the first set of two SAD values (also called an intermediate minimum). Then, the FindMin component 1308 may find the minimum SAD between the second set of SAD values and the minimum SAD (i.e., a first intermediate minimum) from the first set of SAD values, and so on. The FindMin component 1308 may continue to compare the next set of SAD values with the intermediate minimum from the previous sets of SAD values until the minimum of all 25 SAD values is determined.

To do this, the output of the FindMin component 1308 is provided to the latch component 1512. The latch component 1512 may receive, for example, the minimum SAD identified by the FindMin component 1308 during each pass and an index associated with the minimum SAD. The information is provided for the next comparison by the FindMin component 1308 until all comparisons are completed. The information from the latch component 1512 is also provided to the MUX 1310 as described above so that the final output of the latch component 1512 is or can be used to obtain the first and second refined motion vectors, the refined first and second prediction blocks, or some combination thereof.

Figure 15B:
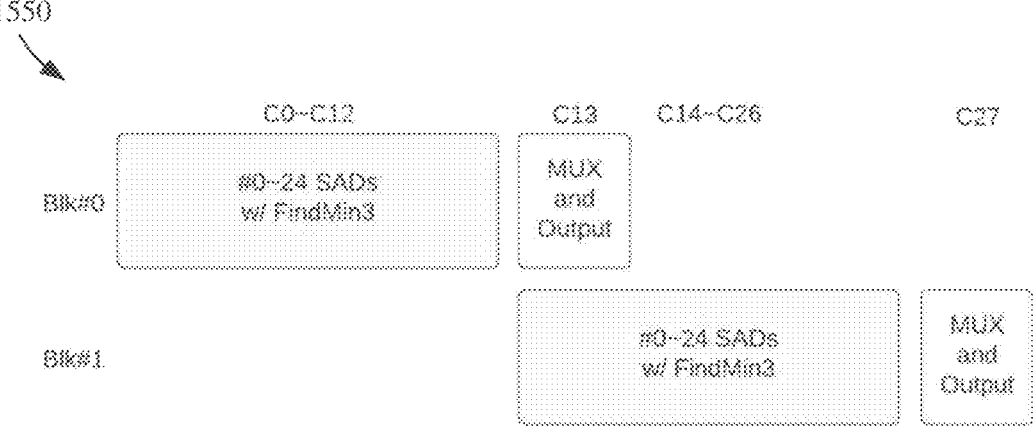
FIG. 15B is a timing diagram identifying the hardware components of FIG. 15A active during each clock count.

FIG. 15B is a timing diagram 1550 identifying the hardware components of FIG. 15A active during each clock count. FIG. 15B, the hardware architecture 1500 uses the first through thirteenth clock counts (C0-C12) to find the minimum SAD for a first block BLK #0 from the 25 integer pixel locations. That is, the clock counts are used to perform 2 SAD calculations, find the intermediate minimum using the FindMin component 1308, and store the intermediate minimum using the latch component 1512, perform 2 more SAD calculations, find the new intermediate minimum using the FindMin component 1308, and store the new intermediate minimum using the latch 1512, and so on, until the remaining 1 SAD is determined and the final minimum is found. Multiplexing and output occurs at a fourteenth clock count (C13).

Because components of the hardware architecture 1500 are used multiple times for processing the current block, limited operations can occur concurrently during sequential processing of blocks. For example, the next block, here Blk #1, may not begin processing using the hardware architecture 1500 until the fourteenth clock count, where the SAD operations are complete for the first block Blk #0. As a result, after enough clock counts have passed to allow a first block to pass through the hardware architecture 1500 (e.g., output at the fourteenth count), the hardware architecture 1500 can produce outputs for modifying one block every thirteen clock counts.

As described above, a multi-step (e.g., a two-step or two-stage) search can be performed, as illustrated with respect to search area 1026 of FIG. 10. The hardware architecture 1600, the hardware architecture 1700, and the hardware architecture 1800 shown in FIGS. 16A-18B are embodiments configured to perform the 2-step search described above.

Figure 16A:
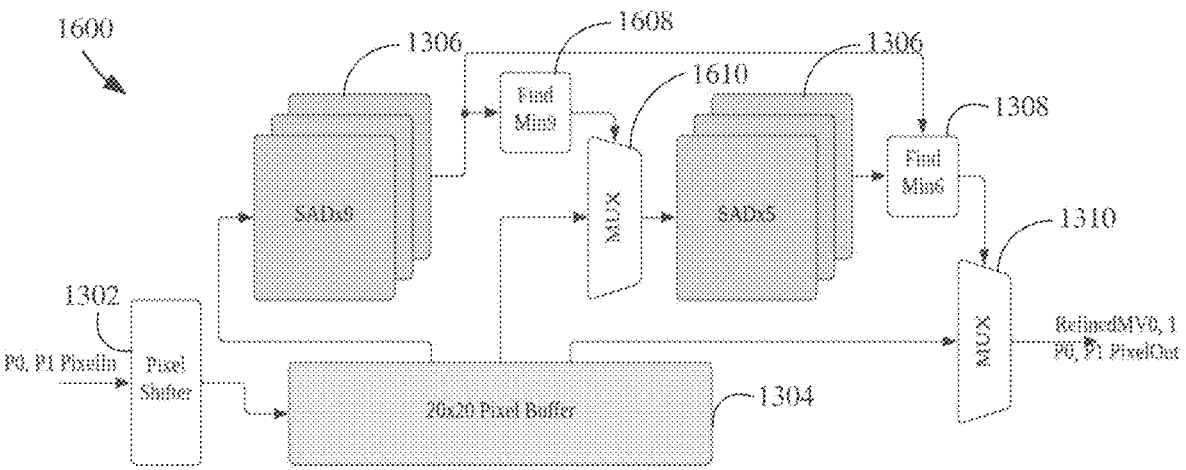
FIG. 16A is a schematic of a fourth embodiment of hardware architecture used for decoder-side motion vector refinement.

Referring to FIG. 16A, a schematic of a fourth embodiment of a hardware arrangement or architecture 1600 used for DMVR is shown. Like the hardware architecture 1300, the hardware architecture 1600 may be used to implement the same portion of the technique 1200 as described in FIG. 13A.

The hardware architecture 1600 contains the pixel shifter 1302, the pixel buffer 1304, two sets of SAD components 1306, a FindMin components 1308, and a MUX 1310. In the hardware architecture 1600, there is a set of 9 SAD components 1306 and a set of 5 SAD components 1306 that are used respectively in the first part and the second part of the 2-step motion vector refinement. The set of 9 SAD components 1306 may search the 9 integer pixel locations shown with pattern 1030 in FIG. 10, and the set of 5 SAD components may search the up to 5 integer pixel locations shown with pattern 1034 in FIG. 10.

In the hardware architecture 1600, a FindMin component 1608 is configured to determine the minimum SAD value from the 9 SAD values determined by the set of 9 SAD components 1306. The minimum SAD value from the FindMin component 1608 is provided to the MUX 1610 and to the FindMin component 1308.

The MUX 1610 may select the integer pixel locations to be searched by the set of 5 SAD components 1306. For example, based on the minimum SAD output by the FindMin component 1608 from the 9 SAD values from the 9 SAD components 1306, the MUX 1610 selects the up to 5 integer pixel locations to be searched by the set of 5 SAD components 1306 based on the prediction blocks recentered by modifying the initial first and second MVs using the offset MV corresponding to the position of the minimum SAD output. The MUX 1610 assigns respective shifted blocks for the second step integer pixel locations to the second set of SAD components 1306.

The FindMin component 1308 is labeled FindMin6 because it accepts up to 6 inputs to determine the final minimum SAD value between the up to 5 SAD values determined by the set of 5 SAD components 1306 and the minimum SAD from first stage of 9 SAD values determined by the set of 9 SAD components 1306.

Figure 16B:
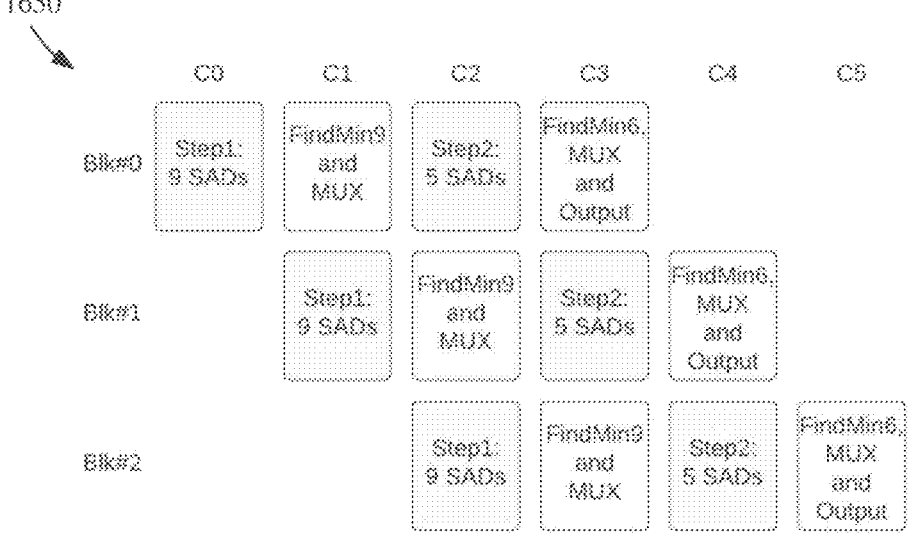
FIG. 16B is a timing diagram identifying the hardware components of FIG. 16A active during each clock count.

FIG. 16B is a timing diagram 1650 identifying the hardware components of FIG. 16A active during each clock count. As shown in FIG. 16B, the hardware architecture 1600 may use the first clock count (C0) to determine 9 SAD values for a first block Blk #0 in the first step using the set of 9 SAD components 1306, the second clock count (C1) to find the minimum of the 9 SAD values and select the integer pixel locations to be searched by the set of 5 SAD components 1306 in the second step, the third clock count (C2) to determine the up to 5 SAD values in the second step using the set of 5 SAD components 1306, and the fourth clock count (C3) to find the minimum SAD between the up to 5 SAD values determined by the set of 5 SAD components 1306 and the minimum SAD output from the FindMin component 1308 and to operate the MUX 1310.

The operations shown by the clock counts in FIG. 16B may occur for multiple blocks (i.e., sub-blocks) sequentially. For example, the set of 9 SAD components 1306 find SAD values for the first block Blk #0 C0. Then, during C1, processing of the first block is complete at the SAD components 1306 for the first step. Accordingly, processing of the second block Blk #1 can start with the calculation of SAD values using the same set of 9 SAD components 1306. Once the step 1 calculations for the second block Blk #1 using the set of 9 SAD components 1306 are complete, and processing for the second block Blk #1 advances to C2, the first step processing for the third block Blk #2 can start at C2 using the set of 9 SAD components 1306. Similarly, the second step processing of the first block Blk #0 using the set of 5 SAD components 1306 is completed before the second step processing of the second block Blk #1 using the set of 5 SAD components 1306 starts at the next clock count (C3). Then, the second step processing of the third block Blk #5 using the set of 5 SAD components 1306 starts at the next clock count (C4) after the second block Blk #1 is done using the 5 SAD components 1306.

As a result of this timing, after enough clock counts have passed to allow a first block to pass through the hardware architecture 1600 (at C3), the hardware architecture 1600 can output data to produce one block every clock count.

Figure 17A:
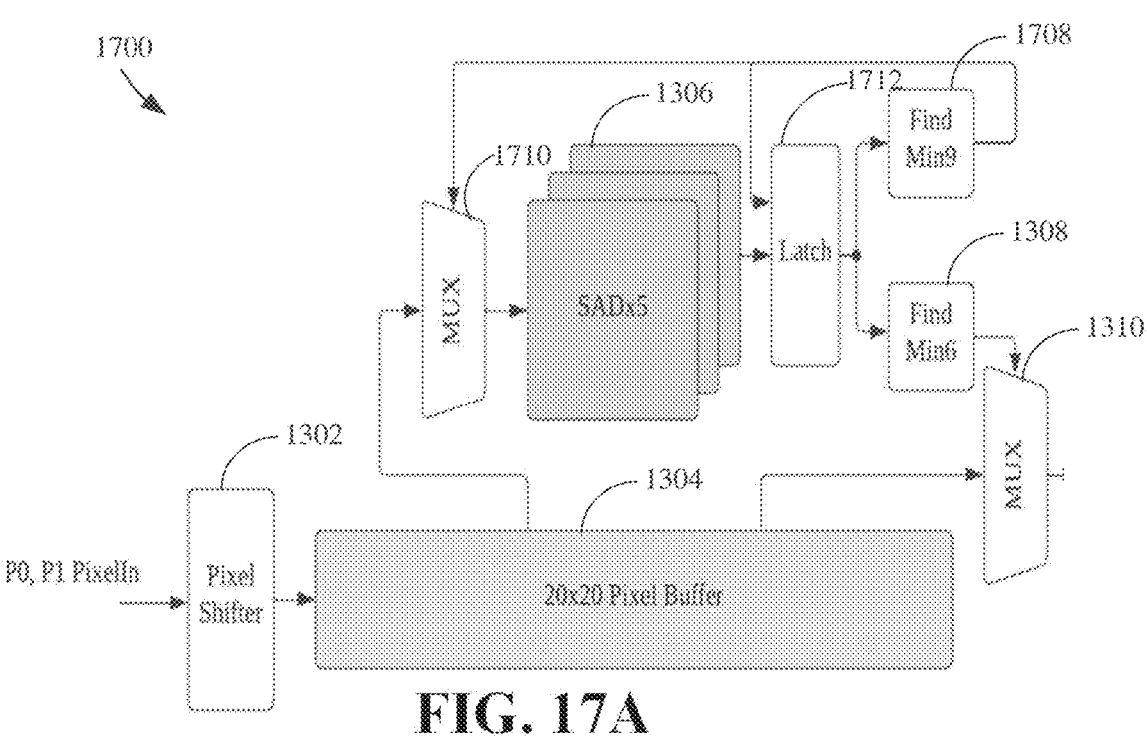
FIG. 17A is a schematic of a fifth embodiment of hardware architecture used for decoder-side motion vector refinement.

Referring to FIG. 17A, a schematic of a fifth embodiment of a hardware arrangement or architecture 1700 used for DMVR is shown. Like the hardware architecture 1300, the hardware architecture 1700 may be used to implement the same portion of the technique 1200 as described in FIG. 13A.

The hardware architecture 1700 contains the pixel shifter 1302, the pixel buffer 1304, SAD components 1306, a FindMin components 1308, and the MUX 1310.

In the hardware architecture 1700, there are 5 SAD components 1306. The 5 SAD components 1306 may search the 25 integer pixel locations using multiple clock counts. The 5 SAD components 1306 may calculate 5 SAD values for the integer pixel locations of the 9 integer pixel locations shown with pattern 1030 in FIG. 10 and calculate the remaining 4 SAD values of the first step to obtain a complete set of 9 SAD values. The MUX 1710, like the MUX 1410A, determines which blocks are assigned to which of the 5 SAD components 1306. The latch component 1712 stores each of the 9 SAD values, and the FindMin component 1708 determines the minimum SAD value using the 9 SAD values as input.

Then, the output of the FindMin component 1708 is provided to the latch component 1712 for the determination of the minimum in the second step. The output of the FindMin component 1708 is also provided to the MUX 1710 to select the pixel values for the second step based on the updated starting position of the search.

Then, after using the MUX 1710 to select the remaining integer pixel locations to be searched based on the location of the pixel resulting in the lowest SAD value from the first step, the 5 SAD components 1306 may search the up to 5 integer pixel locations shown with pattern 1034 in FIG. 10 to determine the minimum SAD value. More particularly, each of the integer pixel locations is used to determine a SAD value from respective SAD components 1306. The outputs are provided to the latch component 1712, and the latch component 1712 provides the up to 5 SAD values to the FindMin component 1308 for comparison with the minimum SAD value from the first step. The MUX 1310 outputs at least one variable for refining the motion vector prediction as described above (e.g., the offset MV, the first refined MV, the second refined MV, the refined first prediction block and/or the refined second prediction block).

Figure 17B:
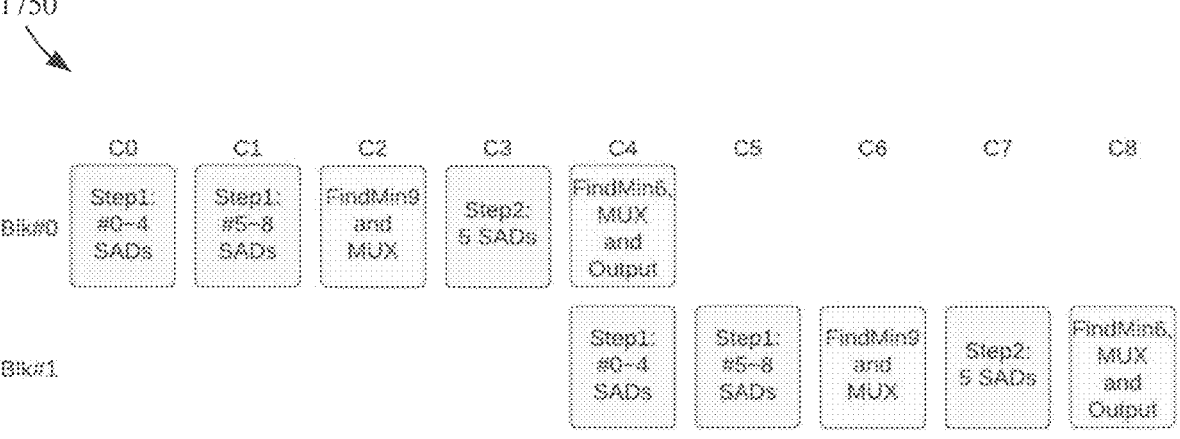
FIG. 17B is a timing diagram identifying the hardware components of FIG. 17A active during each clock count.

FIG. 17B is a timing diagram 1750 identifying the hardware components of FIG. 17A active during each clock count. As shown in FIG. 17B, the hardware architecture 1700 may use the first clock count (C0) to determine 5 of the 9 SAD values in the first group of pixel locations (i.e., the first step) of a first block Blk #0, the second clock count (C1) to find the remaining 4 of the 9 SAD values in the first group of pixel locations, the third clock count (C2) to determine the minimum SAD from the first group of 9 SAD values and determine the next pixel locations from the MUX 1710, the fourth clock count (C3) to determine the up to 5 SAD values for the second group of pixel locations (i.e., the integer pixels of the second step), and the fifth clock count (C4) to determine the minimum SAD between the up to 5 SAD values of the second step and the minimum SAD from the first step, and operate the MUX 1310.

Because components of the hardware architecture 1700 are used multiple times for processing the current block, limited operations can occur concurrently during sequential processing of blocks. For example, the second block Blk #1 does not begin processing using the SAD components 1306 of hardware architecture 1700 until the fifth count (C4), where the repeated SAD operations of the first block Blk #0 are complete. As a result, after enough clock counts have passed to allow a first block to pass through the hardware architecture 1700 (e.g., output at the fifth count), the hardware architecture 1700 can produce output for modifying one block every four clock counts.

Figure 18A:
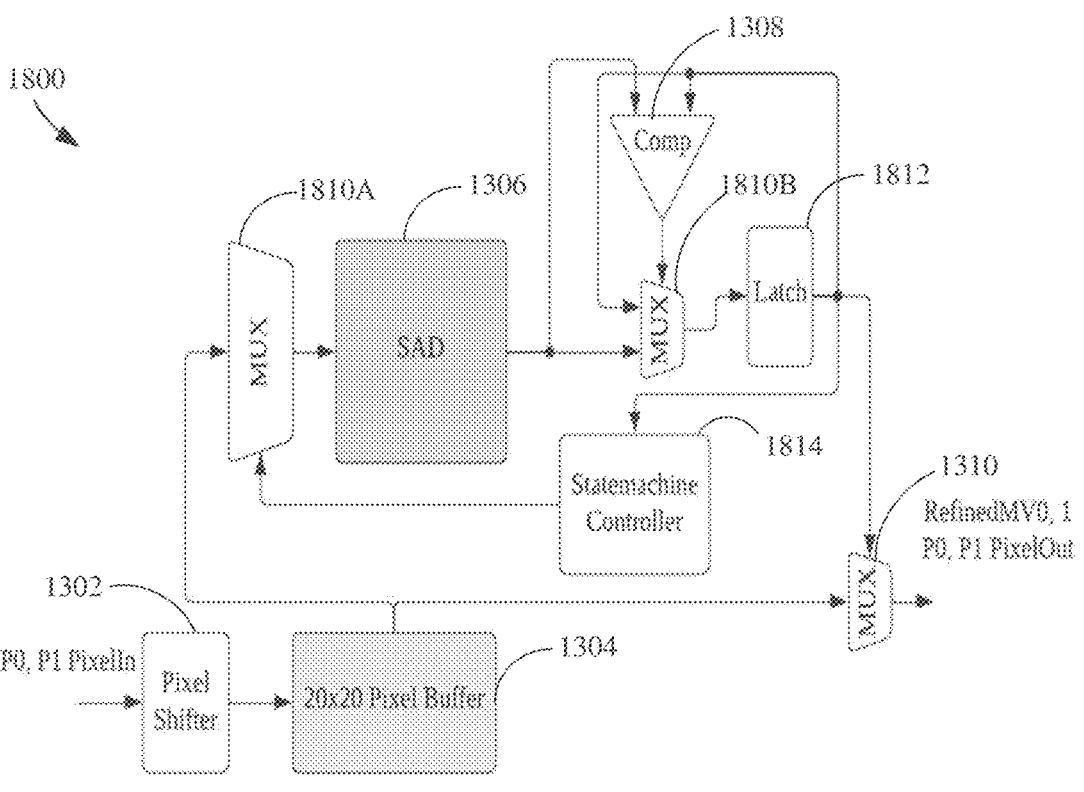
FIG. 18A is a schematic of a sixth embodiment of hardware architecture used for decoder-side motion vector refinement.

Referring to FIG. 18A, a schematic of a sixth embodiment of a hardware arrangement or architecture 1800 used for DMVR is shown. Like the hardware architecture 1300, the hardware architecture 1800 may be used to implement the same portion of the technique 1200 as described in FIG. 13A.

The hardware architecture 1800 contains the pixel shifter 1302, the pixel buffer 1304, SAD components 1306, and a MUX 1310. The comparator labeled 1308 is functionally equivalent to the FindMin component 1308 previously discussed, except that the comparator only receives two inputs.

In the hardware architecture 1800, there is 1 SAD component 1306. The SAD component 1306 may search up to 14 integer pixel locations (i.e., the 9 integer pixel locations shown with pattern 1030 in FIG. 10 as the first step, and the up to 5 remaining integer pixel locations shown with pattern 1034 in FIG. 10 as the second step) using multiple clock counts. For example, the SAD component 1306 may search the 9 integer pixel locations shown with pattern 1030 in FIG. 10 to obtain respective values for the 9 pixel locations.

The hardware architecture 1800 uses the comparator to find a minimum SAD between the SAD determined for prediction blocks at respective pixel locations and the previously determined minimum SAD. The comparator compares two SAD values at a time, and the minimum SAD from the two SAD values may be provided to the MUX 1810B to be stored in the latch component 1404, along with the output values for the current minimum generated by the MUX 1810B, until the minimum SAD value is used in the next comparison. As a result, the comparator is able to find the minimum SAD from the first group of 9 SAD values.

Knowing the minimum SAD from the first group, the associated pixel location can be used by the multiplexer 1810A to select the pixel values for the remaining integer pixel locations to be searched by instructions from the state machine controller 1814. The SAD component 1306 may then calculate a SAD value for the up to 5 remaining integer pixel locations, in turn, to search for the minimum SAD value using the comparator with the initial value being the minimum SAD from the first group of 9 SAD values.

Once all integer pixel values of the 20-step process are considered, the output of the latch component 182 is provided to the MUX 1310 as previously described.

In some implementations, the comparator 1812 could be implemented as a FindMin component 1308 configured to find the minimum of two SAD values at a time.

As mentioned, the hardware architecture 1800 includes a statemachine controller 1814. The statemachine controller 1814 is responsible for cycling through the integer pixel locations to be searched (according to a desired sequence) and for determining where the up to 5 remaining integer pixel locations are located based on the minimum SAD from the group of 9 SAD values. Although a statemachine controller 1814 is not shown in the other hardware arrangements or architectures described herein, one may be included in each to sequence the search for the minimum difference (e.g., the best similarity).

Figure 18B:
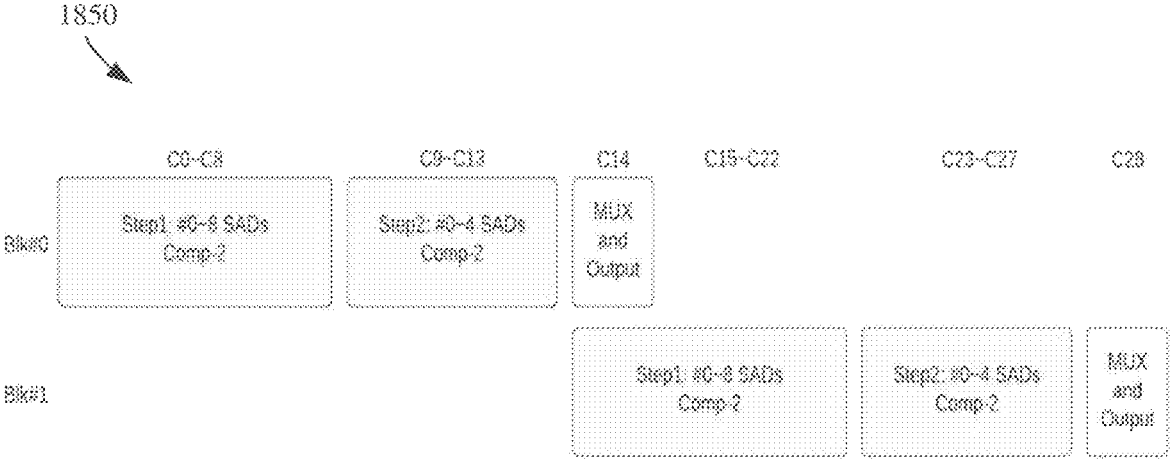
FIG. 18B is a timing diagram identifying the hardware components of FIG. 18A active during each clock count.

FIG. 18B is a timing diagram 1850 identifying the hardware components of FIG. 18A active during each clock count. As shown in FIG. 18B, the hardware architecture 1800 may use the first through ninth clock counts (C0-C8) to sequentially determine the 9 SAD values for a first block Blk #0 using the SAD component 1306 for the first step of the 2-stage process and to determine the minimum SAD value using the comparator. Then, the remaining up to 5 pixel locations are used to sequentially determine up to 5 SAD values of the second step and to determine the minimum SAD value using the up to 5 SAD values and the minimum SAD value from the first step during the tenth through fourteenth clock counts (C9-C13). A fifteenth block count (C14) uses the MUX 1310 to produce the output for reconstruction of the first block Blk #0.

Because components of the hardware architecture 1800 are used multiple times for processing the current block, limited operations can occur concurrently during sequential processing of blocks. For example, the second block Blk #1 does not begin processing using the SAD component 1306 of the hardware architecture 1800 until fifteenth clock count (C14), where SAD operations are complete. As a result, after enough clock counts have passed to allow a first block to pass through the hardware architecture 1800 (at C14), the hardware architecture 1800 can produce output for reconstruction of one block every fourteen clock counts.

In each of the hardware arrangement or architectures described above, the MUX 1310 outputs each of a first refined MV determined by modifying the first initial MV using the offset MV, a second refined MV determined by modifying the second initial MV using the offset MV, a refined first prediction block centered at a position within the first reference frame identified by the first refined motion vector, or a refined second prediction block centered at a position within the second reference frame identified by the second refined motion vector. This is not required—only at least one refined value for reconstruction of a sub-block of the current block determined using the offset MV need be output. For example, the refined MVs are not needed unless they would be useful for other subsequent processing. As another example, and as described above, it is possible to only perform refinement for one motion vector, while leaving the other unchanged. In this latter example, the only one refined prediction block, one refined MV, or both, may be output.

In the hardware architecture 1300 and the hardware architecture 1600, the components are arranged in a pipeline such that one block (i.e., sub-block) is processed during each clock count. However, in the hardware architecture 1400, the hardware architecture 1500, the hardware architecture 1700, and the hardware architecture 1800, the components are arranged such that components are used multiple times while processing the same block, and output for reconstructing one block is produced every four, thirteen, four, or fourteen clock counts, respectively.

Each component costs both space and money. For example, a hardware architecture containing 25 SAD components 1306 may take up more physical space and cost more than a hardware architecture containing 1 SAD component 1306. Thus, for some applications, it may be useful to reduce the number of components in the hardware architecture. Larger numbers of components reduce processing time, so there may be a tradeoff between cost and speed.

That is, using components multiple times while processing the same block may require fewer components and still produce blocks fast enough for some applications. A block produced each 16 clock counts or less may be sufficient.

However, in some implementations, it may be desirable to produce one block each clock cycle. Thus, it may be preferable for a hardware architecture to use each component only once for the current block.

In any event, the number of hardware components used to determine difference values, in this example the SAD values, can depend on a desired block throughput by a defined number of clock counts as the use by a subsequent block of pixels of determination of the difference values occurs only where the previous block is done using these hardware components. The number of hardware components used to determine the difference values can thus also depend on whether the minimum of the respective difference values is selected using a one-stage process or a two-stage process because, for example, whether the hardware components are repeatedly used for the first step processing of a block and/or are also used for the second step affect when processing the subsequent block can start.

For simplicity of explanation, the techniques disclosed herein are depicted and described as respective series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A hardware arrangement for decoder side motion vector refinement, comprising:
a first hardware component comprising a buffer configured to store pixel values of pixels of a first prediction block from a first reference frame that is identified by a first initial motion vector (MV) and pixels defined by a first search area of the first prediction block, and configured to store a second prediction block from a second reference frame that is identified by a second initial MV vector and pixels defined by a second search area for the second prediction block, wherein the first initial MV vector and the second initial MV were used for inter prediction of a current block of image data;
a number of second hardware components configured to, for multiple pixel locations of the first search area and the second search area defined by respective offset motion vectors (MVs), determine a respective difference value between the first prediction block and the second prediction block shifted by the respective offset MVs;
a third hardware component configured to determine a minimum of the respective difference values, a location of the minimum associated with an offset MV of the respective offset MVs; and
a fourth hardware component configured to output at least one refined value for reconstruction of a sub-block of the current block determined using the offset MV, wherein the at least one refined value comprises at least one of a first refined MV determined by modifying the first initial MV using the offset MV, a second refined MV determined by modifying the second initial MV using the offset MV, a refined first prediction block centered at a position within the first reference frame identified by the first refined motion vector, or a refined second prediction block centered at a position within the second reference frame identified by the second refined motion vector.

2. The hardware arrangement of claim 1, wherein the number of second hardware components is dependent on a defined number of clock counts associated with a desired throughput.

3. The hardware arrangement of claim 2, wherein the number of second hardware components is dependent on whether the multiple pixel locations of the first area and the second search area are processed using a 1-stage process or a 2-stage process.

4. The hardware arrangement of claim 2, wherein the defined number of clock counts comprises one of 1, 4, 13, or 14 clock counts.

5. The hardware arrangement of claim 1, wherein the number of second hardware components is dependent on whether the multiple pixel locations of the first area and the second search area are processed using a 1-stage process or a 2-stage process.

6. The hardware arrangement of claim 1, wherein
the buffer comprises two 20×20 pixel buffers, a first of the two 20×20 pixel buffers configured to store the first prediction block with pixels about a periphery of the first prediction block defined by the first search area,
a second of two 20×20 pixel buffers storing the second prediction block and pixels about a periphery of the second prediction block defined by the second search area, and
each of the first prediction block and the second prediction block comprises a 16×16 pixel block.

7. The hardware arrangement of claim 1, comprising:
a latch configured to store an output of the third hardware component, wherein
the multiple pixel locations of the first search area and the second search area are processed using a 1-stage process,
the first search area comprises a 5×5 pixel area about a center pixel of the first prediction block,
the second search area comprises a 5×5 pixel area about a center pixel of the second prediction block,
the number of second hardware components comprises 7 second hardware components, each determining at least one difference value, and
the third hardware component is configured to determine the minimum of the respective difference values by determining a first intermediate minimum using a first set of 7 difference values from the second hardware components as input, determining a second intermediate minimum using a second set of 7 difference values from the second hardware components and the first intermediate minimum stored by the latch as input, determining a third intermediate minimum using a third set of 7 difference values from the second hardware components and the second intermediate minimum stored by the latch as input, and determining the minimum using a first set of 4 difference values from the second hardware components and the third intermediate minimum stored by the latch as input.

8. The hardware arrangement of claim 1, comprising:
a latch configured to store an output of the third hardware component, wherein
the multiple pixel locations within the first area and the second search area are processed using a 1-stage process,
the first search area comprises a 5×5 pixel area about a center pixel of the first prediction block,
the second search area comprises a 5×5 pixel area about a center pixel of the second prediction block,
the number of second hardware components comprises 2 second hardware components, each determining at least one difference value, and
the third hardware component is configured to determine the minimum of the respective difference values by determining a first intermediate minimum using a first set of 2 difference values from the second hardware components as input, determining a second intermediate minimum using a second set of 2 difference values from the second hardware components and the first intermediate minimum stored by the latch as input, determining a third intermediate minimum using a third set of 2 difference values from the second hardware components and the second intermediate minimum stored by the latch as input, determining a fourth intermediate minimum using a fourth set of 2 difference values from the second hardware components and the third intermediate minimum stored by the latch as input, determining a fifth intermediate minimum using a fifth set of 2 difference values from the second hardware components and the fourth intermediate minimum stored by the latch as input, determining a sixth intermediate minimum using a sixth set of 2 difference values from the second hardware components and the fifth intermediate minimum stored by the latch as input, determining a seventh intermediate minimum using a seventh set of 2 difference values from the second hardware components and the sixth intermediate minimum stored by the latch as inputs, determining an eighth intermediate minimum using an eighth set of 2 difference values from the second hardware components and the seventh intermediate minimum stored by the latch as input, determining a ninth intermediate minimum using a ninth set of 2 difference values from the second hardware components and the eighth intermediate minimum stored by the latch as input, determining a tenth intermediate minimum using a tenth set of 2 difference values from the second hardware components and the ninth intermediate minimum stored by the latch as input, determining an eleventh intermediate minimum using an eleventh set of 2 difference values from the second hardware components and the tenth intermediate minimum stored by the latch as input, determining a twelfth intermediate minimum using a twelfth set of 2 difference values from the second hardware components and the eleventh intermediate minimum stored by the latch as input, and determining the minimum using a thirteenth set of 2 difference values from the second hardware components and the twelfth intermediate minimum stored by the latch as input.

9. The hardware arrangement of claim 1, wherein
the multiple pixel locations within the first area and the second search area are processed using a 1-stage process,
the first search area comprises a 5×5 pixel area about a center of the first prediction block,
the second search area comprises a 5×5 pixel area about a center of the second prediction block,
the number of second hardware components comprises 25 second hardware components, each determining a single difference value, and
the third hardware component is configured to determine the minimum of 25 difference values output from the 25 second hardware components.

10. The hardware arrangement of claim 1, wherein
the multiple pixel locations within the first area and the second search area are processed using a 2-stage process,
the first search area comprises a 5×5 pixel area about a center of the first prediction block,
the second search area comprises a 5×5 pixel area about a center of the second prediction block,
the number of second hardware components comprises a first set of second hardware components and a second set of second hardware components, each determining a difference value, and
the third hardware component comprises two components, a first of the two components configured to determine an intermediate minimum value from 9 difference values determined by the first set of hardware components using pixel locations in a 3×3 search area centered at the center of each of the first prediction block and the second prediction block, and a second of the two components configured to determine the minimum of up to 5 difference values determined by the second set of hardware components using remaining pixel locations of the 5×5 pixel areas in a 3×3 search area centered at a pixel location where the intermediate minimum value was determined and the intermediate minimum value as input.

11. The hardware arrangement of claim 1, comprising:
a latch configured to store an output of the third hardware component, wherein
the multiple pixel locations within the first area and the second search area are processed using a 2-stage process,
the first search area comprises a 5×5 pixel area about a center of the first prediction block,
the second search area comprises a 5×5 pixel area about a center of the second prediction block,
the number of second hardware components comprises 5 second hardware components, each determining at least one difference value, and
the third hardware component comprises two third hardware components, a first of the third hardware components configured to determine an intermediate minimum from 9 difference values determined by the second hardware components using pixel locations in a 3×3 search area centered at the center of each of the first prediction block and the second prediction block, and a second of the third hardware components configured to determine the minimum using the intermediate minimum stored by the latch and up to 5 difference values determined by the second hardware components using remaining pixel locations of the 5×5 pixel area in a 3×3 search area centered at a pixel location where the first intermediate minimum value was determined as input.

12. The hardware arrangement of claim 1, comprising:

a latch configured to store an output of the third hardware component, wherein the multiple pixel locations within the first area and the second search area are processed using a 2-stage process, the first search area comprises a 5×5 pixel area about a center of the first prediction block, the second search area comprises a 5×5 pixel area about a center of the second prediction block, the number of second hardware components comprises 1 second hardware component, the third hardware component outputs an intermediate minimum between a current difference value and a previous difference value determined by the second hardware component for pixel locations in a 3×3 search area centered at the center of each of the first prediction block and the second prediction block, and outputs the minimum between a current difference value and a previous difference value determined by the second hardware component for remaining pixel locations of the 5×5 pixel area in a 3×3 search area centered at a pixel location where the intermediate minimum value was determined.

13. The hardware arrangement of claim 12, wherein the third hardware component is a comparator.

14. The hardware arrangement of claim 1, comprising:

a state machine controller configured to select pixel values from the buffer for input into the second hardware components.

15. The hardware arrangement of claim 1, wherein each of the difference values is at least one of a sum of absolute differences or a mean square error.

16. The hardware arrangement of claim 1, wherein the minimum of the respective difference values is selected using a 2-stage process, and the number of second hardware components comprises fewer than a number of pixels defining the first search area.

17. The hardware arrangement of claim 1, wherein the fourth hardware component comprises a multiplexer having an output including the first refined MV, the second refined MV, the refined first prediction block, and the refined second prediction block.

18. A hardware decoder, comprising:

the hardware arrangement of claim 1, wherein the fourth hardware component comprises a multiplexer having an output including the first refined MV, the second refined MV, the refined first prediction block, and the refined second prediction block; and a reconstruction stage configured to reconstruct the sub-block of the current block using the output of the multiplexer.

19. The hardware decoder of claim 18, comprising:

an entropy decoding stage configured to decode the first initial MV and the second initial MV from a header of the current block.

\* \* \* \* \*